US010912176B2

(12) United States Patent
Masuda et al.

(10) Patent No.: US 10,912,176 B2
(45) Date of Patent: Feb. 2, 2021

(54) VEHICLE LAMP

(71) Applicant: KOITO MANUFACTURING CO., LTD., Tokyo (JP)

(72) Inventors: Takeshi Masuda, Shizuoka (JP);
Shigeyuki Watanabe, Shizuoka (JP);
Hajime Takeda, Shizuoka (JP);
Akihito Horikawa, Shizuoka (JP);
Masaaki Nakabayashi, Shizuoka (JP);
Yusuke Nakada, Shizuoka (JP);
Osamu Endo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/434,708

(22) Filed: Jun. 7, 2019

(65) Prior Publication Data

US 2019/0289696 A1  Sep. 19, 2019

Related U.S. Application Data

(63) Continuation of application No. 15/772,000, filed as application No. PCT/JP2016/079322 on Oct. 3, 2016, now Pat. No. 10,470,274.

(30) Foreign Application Priority Data

Oct. 27, 2015 (JP) ................................ 2015-210745
Oct. 27, 2015 (JP) ................................ 2015-210746
Oct. 27, 2015 (JP) ................................ 2015-210748

(51) Int. Cl.
*H05B 37/02* (2006.01)
*H05B 47/105* (2020.01)
(Continued)

(52) U.S. Cl.
CPC ............. *H05B 47/105* (2020.01); *B60Q 1/00* (2013.01); *B60Q 1/0011* (2013.01);
(Continued)

(58) Field of Classification Search
CPC ............ H05B 37/0218; H05B 37/0227; H05B 47/115; H05B 47/125; B60Q 1/1423; B60Q 1/143; B60Q 1/1446
(Continued)

(56) References Cited

U.S. PATENT DOCUMENTS 3,944,330 A  3/1976 Tsunoda et al.
6,102,559 A  8/2000 Nold et al.
(Continued)

FOREIGN PATENT DOCUMENTS

CN  104048236 A  9/2014
DE  679089 U  7/1954
(Continued)

OTHER PUBLICATIONS

Partial Supplementary European Search Report issued in Application No. 16859485.1, dated Jul. 17, 2019 (7 pages).
(Continued)

*Primary Examiner* — Tung X Le
(74) *Attorney, Agent, or Firm* — Osha Bergman Watanabe & Burton LLP

(57) ABSTRACT

A vehicle lamp has a roof unit. The roof unit includes a plurality of types of light output units having different illumination functions, a light emission drive unit configured to cause the plurality of types of light output units to output lights, and a monitoring sensor. The roof unit is arranged at a roof part of a vehicle.

8 Claims, 16 Drawing Sheets

(51) Int. Cl.

| | | |
|---|---|---|
| *F21V 23/00* | (2015.01) | |
| *F21S 41/00* | (2018.01) | |
| *B60Q 1/00* | (2006.01) | |
| *B60Q 1/50* | (2006.01) | |
| *B60Q 1/38* | (2006.01) | |
| *B60Q 1/24* | (2006.01) | |
| *B60Q 1/34* | (2006.01) | |
| *B60Q 1/26* | (2006.01) | |
| *B60Q 1/28* | (2006.01) | |
| *B60Q 1/30* | (2006.01) | |
| *B60Q 1/32* | (2006.01) | |

(52) U.S. Cl.
CPC ............ *B60Q 1/0035* (2013.01); *B60Q 1/24* (2013.01); *B60Q 1/268* (2013.01); *B60Q 1/2611* (2013.01); *B60Q 1/28* (2013.01); *B60Q 1/30* (2013.01); *B60Q 1/32* (2013.01); *B60Q 1/34* (2013.01); *B60Q 1/38* (2013.01); *B60Q 1/50* (2013.01); *F21S 41/00* (2018.01); *F21V 23/00* (2013.01); *B60Q 2400/20* (2013.01)

(58) Field of Classification Search
USPC ............................ 315/77, 82; 307/10.1, 10.8
See application file for complete search history.

(56) References Cited

U.S. PATENT DOCUMENTS

| | | | |
|---|---|---|---|
| 9,956,903 B2* | 5/2018 | Gondhi | B60Q 1/24 |
| 2002/0036908 A1 | 3/2002 | Pederson | |
| 2010/0290774 A1 | 11/2010 | Matsuoka et al. | |
| 2011/0242320 A1 | 10/2011 | Yamada et al. | |
| 2012/0002050 A1 | 1/2012 | Taniguchi et al. | |
| 2013/0058115 A1 | 3/2013 | Pfeil | |
| 2013/0070059 A1 | 3/2013 | Kushida | |
| 2013/0311035 A1 | 11/2013 | Czyz et al. | |
| 2014/0254186 A1 | 9/2014 | Terai et al. | |
| 2014/0301101 A1* | 10/2014 | Russ | B60Q 1/44 |
| | | | 362/520 |
| 2015/0258928 A1 | 9/2015 | Goto et al. | |
| 2015/0266411 A1 | 9/2015 | Bennie et al. | |
| 2016/0142699 A1 | 5/2016 | Kushida | |
| 2016/0236613 A1 | 8/2016 | Trier | |
| 2016/0332568 A1 | 11/2016 | Kim | |
| 2017/0042003 A1 | 2/2017 | Logvinov | |
| 2017/0113599 A1 | 4/2017 | Park et al. | |
| 2017/0138545 A1 | 5/2017 | Minor et al. | |
| 2017/0264886 A1 | 9/2017 | Kushida | |

FOREIGN PATENT DOCUMENTS

| | | |
|---|---|---|
| DE | 10358183 A1 | 7/2005 |
| DE | 10-2015-205630 A1 | 10/2015 |
| EP | 1022510 A2 | 7/2000 |
| JP | S49-60191 A | 6/1974 |
| JP | H01-309838 A | 12/1989 |
| JP | H06-298002 A | 10/1994 |
| JP | 2000-019259 A | 1/2000 |
| JP | 2000-215710 A | 8/2000 |
| JP | 2005-222441 A | 8/2005 |
| JP | 2007-314069 A | 12/2007 |
| JP | 2009-012554 A | 1/2009 |
| JP | 2010-013080 A | 1/2010 |
| JP | 2011-216979 A | 10/2011 |
| JP | 2012-011849 A | 1/2012 |
| JP | 2012216979 A | 11/2012 |
| JP | 2013-163518 A | 8/2013 |
| JP | 2015-145224 A | 8/2015 |
| JP | 2015-171824 A | 10/2015 |
| JP | 2015-179603 A | 10/2015 |
| WO | 02/04247 A1 | 1/2002 |
| WO | 2014/152470 A2 | 9/2014 |

OTHER PUBLICATIONS

International Search Report issued in PCT/JP2016/079322 dated Dec. 20, 2016 (5 pages).
Written Opinion issued in PCT/JP2016/079322 dated Dec. 20, 2016 (7 pages).
Extended European Search Report issued in European Application No. 16859485.1, dated Nov. 29, 2019 (12 pages).
Office Action issued in Japanese Application No. 2017-547688, dated Apr. 21 2020 (24 pages).
Office Action issued in corresponding Chinese Application No. 201680053410.X, dated Jun. 22, 2020 (23 pages).
Office Action issued in Japanese Application No. 2017-547688, dated Sep. 29, 2020 (16 pages).

* cited by examiner

VEHICLE LAMP

BACKGROUND

Technical Field

The present invention relates to a technical field of a vehicle lamp.

CITATION LIST

Patent Documents

Patent Document 1: JP-A-2015-171824
Patent Document 2: JP-A-2013-163518
Patent Document 3: JP-A-2015-145224

Related Art

A variety of vehicle lamp technologies have been known. For example, Patent Document 1 discloses a vehicle lamp including a sensor configured to acquire information of a situation in front of a vehicle, and a light distribution control unit configured to perform light distribution control of changing a light distribution that is to be formed by a lamp unit, in accordance with a signal from the sensor.

Also, Patent Document 2 discloses a vehicle lamp having a monitoring function. That is, in a vehicle headlight device, image information in front of a vehicle captured by a front monitoring camera is acquired, and an attribute of an object in front of the vehicle is determined on the basis of the image information. A camera control means is configured to control an optical magnification of a zoom lens on the basis of acquired vehicle speed information of a host vehicle, and a light distribution control ECU is configured to control a headlight unit in accordance with the attribute of the object. By the above technology, it is possible to accurately determine a situation and an object on a road surface over a wide range ahead of the host vehicle.

Also, for example, as a lamp to be used for a vehicle, a lamp having a plurality of aligned light sources and configured to sequentially turn on the same has been known. Patent Document 3 discloses a method of implementing, as a turn signal, a light emitting operation with no sense of discomfort in a vehicle lamp including a plurality of light emitting elements to be sequentially turned on.

SUMMARY

The vehicle lamp is an indispensable unit that is mounted to a vehicle such as an automobile and configures a part of the vehicle. However, in addition to a function as a simple illumination device, the vehicle lamp is required to have a function and a configuration that can diversely contribute to an operation of the vehicle.

One or more embodiments of the present invention provides a vehicle lamp that is more useful to a vehicle.

Also, a lamp that is to be mounted to a vehicle is considered to have wider functions so as to monitor the periphery and to contribute to environments, not simply for visibility of a driver.

One or more embodiments of the present invention further improves and diversifies functions of a vehicle lamp.

Also, it is important for turn signals for presenting right and left turns to increase recognizability from a peripheral person, for example, a passenger in a peripheral vehicle, a pedestrian and the like. One or more embodiments of the present invention suggests turn signal light emission having higher recognizability. [0009] A vehicle lamp according to one or more embodiments of the present invention includes a plurality of types of light output units having different illumination functions, a light emission drive unit configured to cause the plurality of types of light output units to output lights, and a monitoring sensor, and is arranged at an upper part of a vehicle.

That is, the vehicle lamp is configured as a unit including the plurality of types of light output units having different illumination functions, the light emission drive unit configured to perform light output drive, and the monitoring sensor for monitoring all or part of a peripheral environment. The vehicle lamp is arranged at the upper part of a vehicle.

In the vehicle lamp according to one or more embodiments of the present invention, a following configuration is considered. The plurality of types of light output units is an output unit of laser light, respectively, the light emission drive unit includes a laser light source and a drive circuit of the laser light source, and laser light output from the laser light source is supplied to each light output unit by a light guiding path and is then outputted.

That is, each light output unit is configured to output the laser light from the common laser light source.

In the vehicle lamp according to one or more embodiments of the present invention, it is considered that the vehicle lamp is configured as a roof unit of a vehicle.

That is, a vehicle lamp module itself is configured as a roof of the vehicle.

In the vehicle lamp according to one or more embodiments of the present invention, a following configuration is considered. A light output unit of far light distribution is provided as one type of the plurality of types of light output units having different illumination functions and a light output unit of peripheral light distribution for illuminating a periphery of the vehicle is provided as another type of the plurality of types of light output units having different illumination functions.

For example, a light output unit of far light distribution as a headlight and a light output unit of peripheral light distribution for illuminating a relatively adjacent region over a substantially entire circumference around the vehicle are provided.

In the vehicle lamp according to one or more embodiments of the present invention, a following configuration is considered. A power supply circuit unit configured to generate operating power of each unit and a control unit configured to control a light emitting operation and to control a light emitting operation corresponding to detection information of the monitoring sensor are provided.

That is, the power supply circuit unit and the control unit are also included and unitized.

A vehicle lamp according to one or more embodiments of the present invention includes a peripheral illumination unit including light output units capable of expressing a plurality of colors as illuminating light, in which a plurality of the light output units is arranged along a circumferential direction of a vehicle so that the illuminating light can be irradiated in an entire peripheral direction of the vehicle.

Thereby, it is possible to implement the illumination in the entire peripheral direction of the vehicle.

In the vehicle lamp according to one or more embodiments of the present invention, a following configuration is considered. One or more imaging units for exterior environment recognition are provided. The one or more imaging units are arranged so that an entire peripheral direction of the vehicle can be captured by the one or more imaging units.

An image analysis unit configured to execute processing of detecting a body to be detected as an object or a person around the vehicle from a captured image obtained by the one or more imaging units, and a control unit configured to variably control a color of illuminating light of the light output unit, which is configured to irradiate illuminating light at least in a direction in which the body to be detected recognized by the image analysis unit exists, of the light output units of the peripheral illumination unit in accordance with a main color of the body to be detected are provided.

That is, the body to be detected as a person or an object is recognized using the captured image of the entire peripheral direction of the vehicle obtained by the imaging units. The illuminating light of a color corresponding to the body to be detected is irradiated to the body to be detected.

In the vehicle lamp according to one or more embodiments of the present invention, a following configuration is considered. The imaging units include a visible light camera configured to capture visible light and a far-infrared light camera configured to capture far-infrared light, respectively.

By one imaging unit, a captured image by the visible light camera and a captured image by the far-infrared light camera are obtained as an image in an imaging direction of the one imaging unit, and the body to be detected is detected and recognized using the images.

In the vehicle lamp according to one or more embodiments of the present invention, the plurality of light output units of the peripheral illumination unit is aligned in line on an entire circumference surface of a roof part of the vehicle, and a vertical light emission direction of the light output units is below a horizontal direction of the roof part.

The peripheral illumination unit is provided to the roof part, so that it is possible to improve the visibility of the peripheral illumination from persons around the vehicle at a relatively high position.

In the vehicle lamp according to one or more embodiments of the present invention, it is considered that the light output units include output units of respective laser lights of red light, green light and blue light, respectively.

The light output units configured to output R (red) laser light, G (green) laser light and B (blue) laser light are aligned, so that it is possible to perform illumination, exterior notification and the like by diverse color expressions.

A vehicle lamp according to one or more embodiments of the present invention includes a light output unit provided on a side surface of a vehicle body, and the light output unit is configured to perform turn signal light emission in which an end of emitted light moves toward a front part of the vehicle body.

That is, the light output unit is arranged on a left-side surface and a right-side surface of the vehicle body. The light output unit is configured to perform light output (sequential light emission) in such a way that the end of emitted light gradually moves toward the front part of the vehicle body.

In the vehicle lamp according to one or more embodiments of the present invention, it is considered that the light output unit is configured to perform light emission in such a way that an upper end of the emitted light becomes higher toward the front part of the vehicle.

Upon the sequential light emission, an upper end of a light emission region becomes gradually higher.

A vehicle lamp according to one or more embodiments of the present invention includes light output units configured to perform light output separately from each other for each of left front, left rear, right front and right rear corner parts of a vehicle body at least at both side positions of the corner part, and is configured to perform light output for each of the right front and right rear corner parts from the light output units of both sides of each corner part, as a right turn signal, and to perform light output for each of the left front and left rear corner parts from the light output units of both sides of each corner part, as a left turn signal.

In this case, the light output units are formed at both side positions of the corner part, as seen from each of the corner parts of the vehicle body. As the right turn signal, the light output is performed at least at a right side of a vehicle body front part, at a front part and a rear part of a right-side surface of the vehicle body, and at a right side of a vehicle body rear part. As the left turn signal, the light output is performed at least at a left side of the vehicle body front part, at a front part and a rear part of a left-side surface, and at a left side of the vehicle body rear part.

In the vehicle lamp according to one or more embodiments of the present invention, a following configuration is considered. In the case of the right turn signal, a light output operation is performed so that both a light emission position of the light output unit provided at a vehicle body front part and a light emission position of the light output unit provided at a front part of a right-side surface of the vehicle body face toward the right front corner part of the vehicle and both a light emission position of the light output unit provided at a vehicle body rear part and a light emission position of the light output unit provided at a rear part of the right-side surface of the vehicle body face toward the right rear corner part of the vehicle, and in the case of the left turn signal, a light output operation is performed so that both a light emission position of the light output unit provided at the vehicle body front part and a light emission position of the light output unit provided at a front part of a left-side surface of the vehicle body face toward the left front corner part of the vehicle and both a light emission position of the light output unit provided at the vehicle body rear part and a light emission position of the light output unit provided at a rear part of the left-side surface of the vehicle body face toward the left rear corner part of the vehicle.

That is, in the case of a right turn, a display is performed as if the lights (light output positions) advance from both sides toward the front and rear corner parts of the right side of the vehicle body, and in the case of a left turn, a display is performed as if the lights (light output positions) advance from both sides toward the front and rear corner parts of the left side of the vehicle body.

In the vehicle lamp according to one or more embodiments of the present invention, is it considered that a front window, a right side window, a left side window, and a rear window of the vehicle are respectively configured as the light output units.

The turn signal light emission is performed by using the windows of the vehicle as the large-scale light output units.

According to the vehicle lamp according to one or more embodiments of the present invention, the periphery monitoring and illumination are efficiently performed from the high position, so that it is possible to contribute to improvement on safety of the vehicle traveling. Also, the unit having integrated the illumination function and the monitoring function is configured, so that it is possible to simplify the configuration of the vehicle and to efficiently manufacture the same.

According to one or more embodiments of the present invention, it is possible to perform the illumination in the entire periphery direction of the vehicle and to improve or diversify the functions of the vehicle lamp. Thereby, it is possible to increase the recognizability of the exterior environment of the vehicle and to improve the safety.

According to one or more embodiments of the present invention, it is possible to implement, as the turn signal display, the highly recognizable turn signal from the peripheral persons.

DETAILED DESCRIPTION OF EMBODIMENTS

<Configuration of Vehicle>

Hereinafter, embodiments will be described with reference to the drawings. In the embodiments, it is assumed that a roof module having a function as a vehicle lamp is mounted to a vehicle. In the meantime, the embodiments are merely examples of implementing one or more embodiments of the present invention. A configuration of the present invention is not limited to that to be described later, and can be diversely considered. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
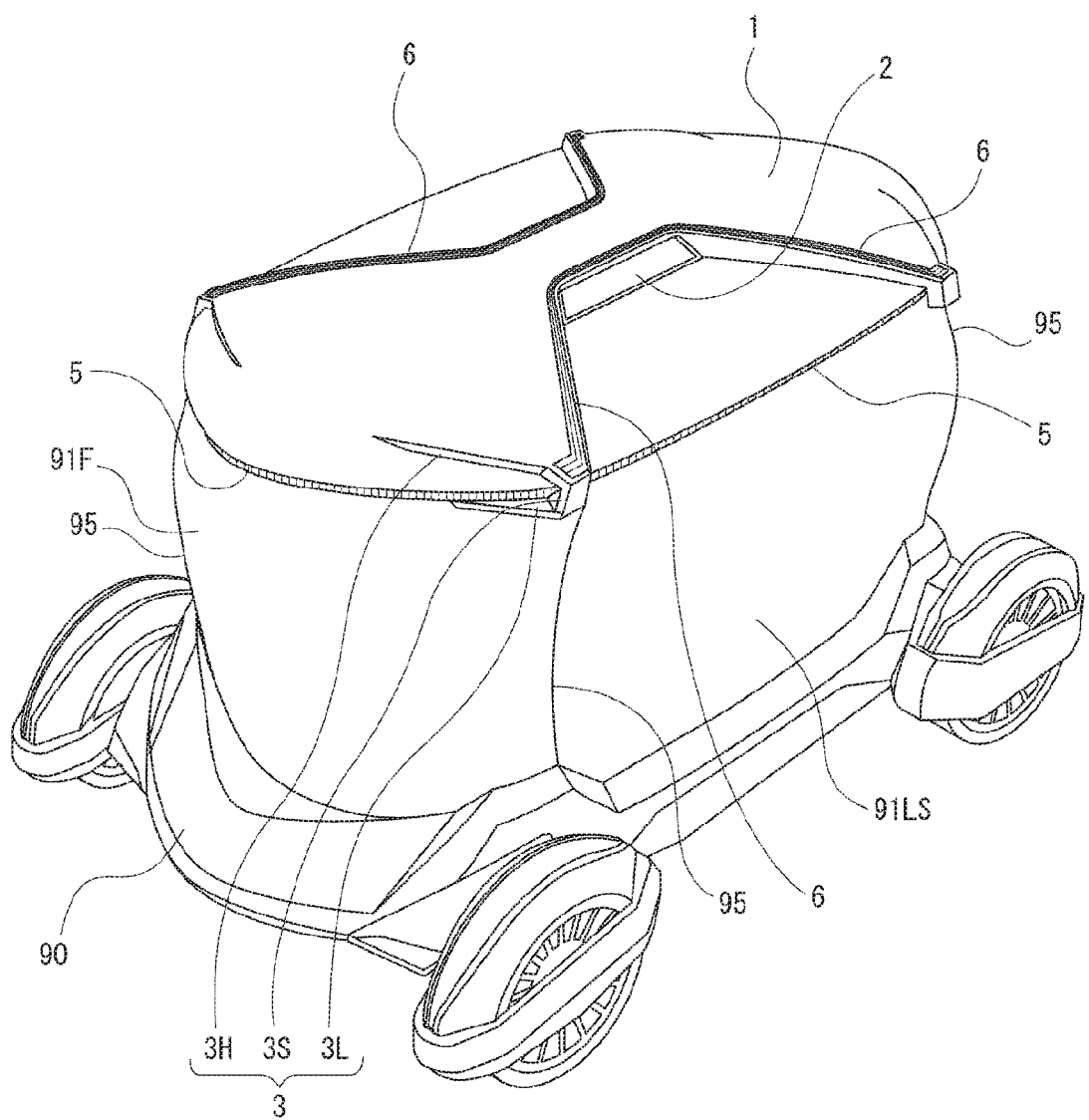
FIG. 1 is a perspective view of a vehicle to which a vehicle lamp in accordance with one or more embodiments of the present invention is mounted.
Figure 2B:
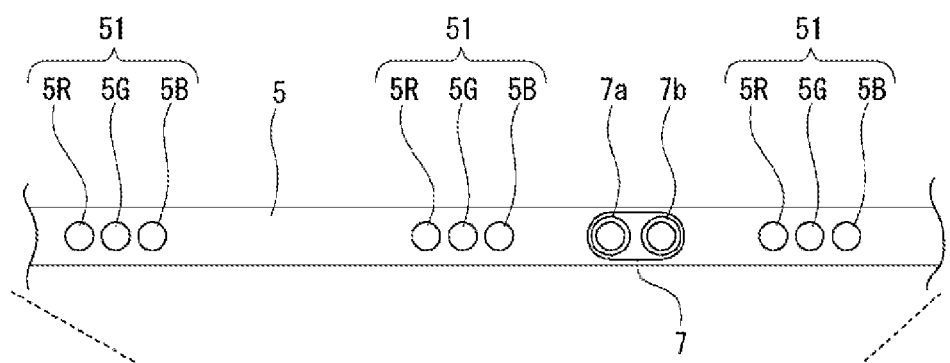
FIGS. 2A and 2B illustrate a configuration of a roof module according to one or more embodiments of the present invention.
Figure 2A:
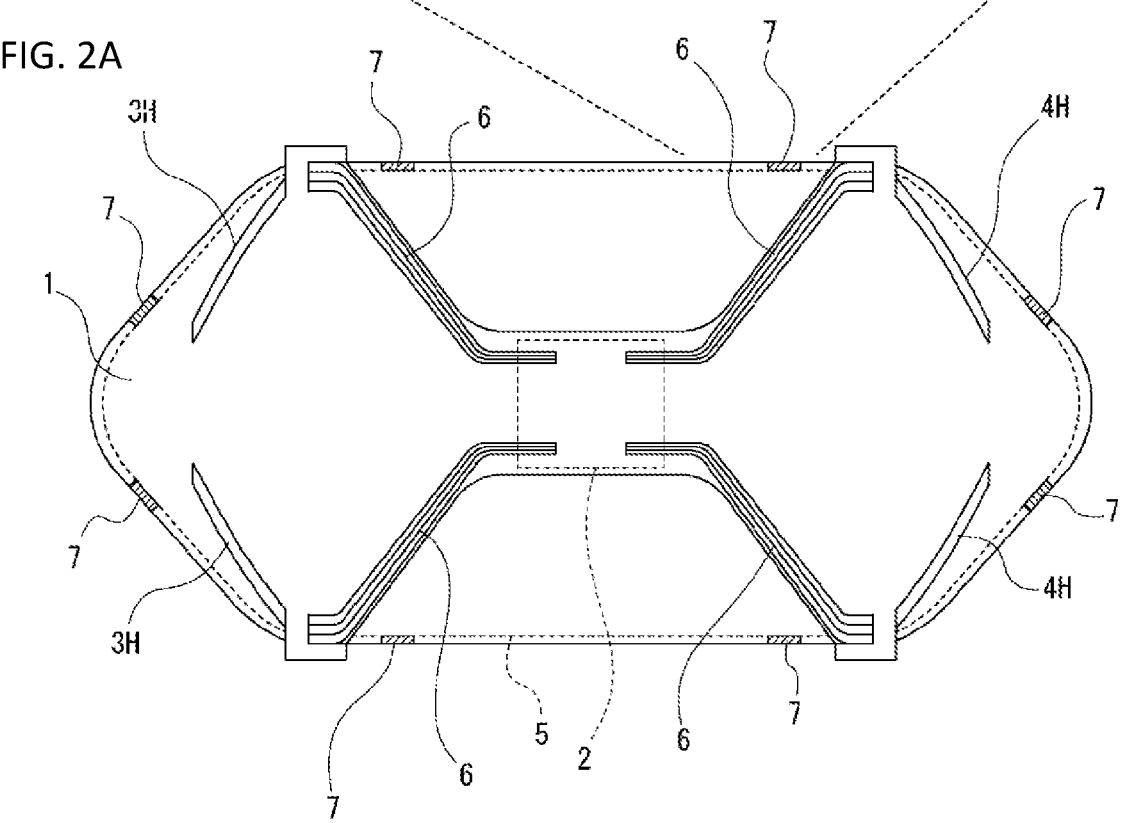

A form of a vehicle 90 is exemplified in FIGS. 1 and 2A. FIG. 1 is a perspective view of the vehicle 90, and FIG. 2A illustrates a roof module 1, as seen from above. In the meantime, the shape, structure and the like of the vehicle 90 to be described later are simply exemplary.

The vehicle 9 is a four-wheeled automobile having a function of traveling as full-automatic driving or partial automatic driving or a function of assisting driving of a driver by a driving support function.

Figure 7:
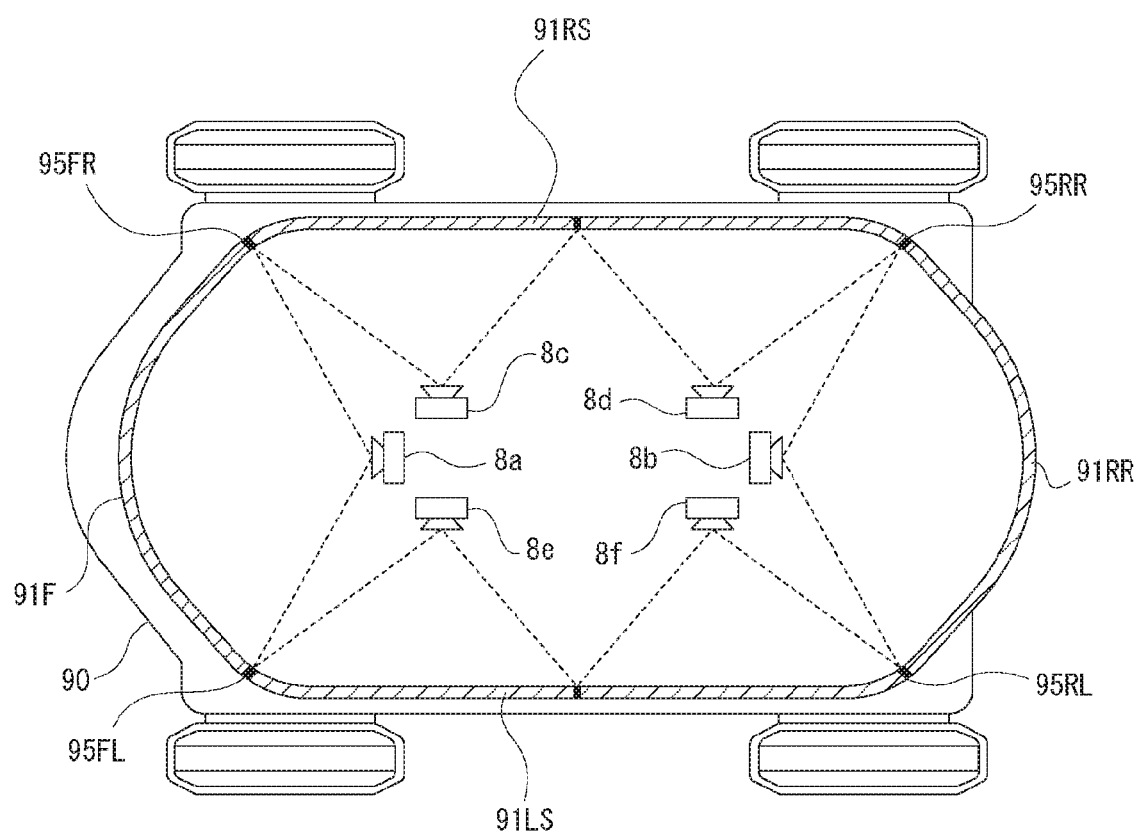
FIG. 7 illustrates projection directions of projectors according to one or more embodiments of the present invention.

A vehicle interior of the vehicle 90 into which a passenger is to get is a space surrounded by a front window 91F, a left side window 91LS, a right side window 91RS (not shown in FIG. 1) and a rear window 91RR (refer to FIG. 7). That is, the vehicle interior is a space in which about 360° around the passenger is configured by a window 91 (when collectively referring to each window, the term "window 91" is used).

In FIG. 1, respective boundaries (joined parts of the windows) between the front window 91F and the left side window 91LS, between the front window 91F and the right side window 91RS, between the rear window 91RR and the left side window 91LS, and between the rear window 91RR and the right side window 91RS are denoted as corner parts 95. The corner part 95 may be transparent, semi-transparent or opaque.

The vehicle 90 is provided at an upper part with a roof module 1. The roof module 1 is configured to form a roof of the vehicle 90 and has a configuration of implementing a variety of functions including a lamp function.

A laser light engine 2 having a laser light source is embedded in a substantially central part of the roof module 1.

A headlight unit 3 is provided at a vehicle front side of the roof module 1. As the headlight unit 3, a high beam output unit 3H, a low beam output unit 3L, and a spot beam output unit 3S are provided. The high beam output unit 3H is configured to output illuminating light of far light distribution, and the low beam output unit 3L is configured to output illuminating light of near light distribution. The spot beam output unit 3S is configured to output illuminating light for spot-irradiating the front.

Also, although not shown in FIG. 1, a rear light unit 4 is provided at a vehicle rear side of the roof module 1. The rear light unit 4 includes a rear beam output unit 4H, a brake lamp unit, a rear lamp unit and the like, for example.

An illumination configuration of the rear light unit 4 may be similar to the headlight unit 3, for example.

As shown in FIGS. 1 and 2A, a side part of the roof module 1 is formed over a substantially entire circumference with a peripheral illumination unit 5. In FIG. 2A, the peripheral illumination unit 5 is shown with a broken line.

In the peripheral illumination unit 5, a plurality of light output units 51 is aligned, so that illumination can be performed in a 360° direction around the vehicle 90. The peripheral illumination unit 5 is arranged to perform the illumination within about 10 m in the entire direction around the vehicle 90, for example.

FIG. 2B is an enlarged pictorial view of a part of the peripheral illumination unit 5. The light output units 51 aligned in the circumferential direction have, respectively, a R (red) laser light output unit 5R, a G (green) laser light output unit 5G and a B (blue) laser light output unit 5B. That is, each of the light output units 51 is configured to output RGB lights, thereby performing illumination, exterior notification and the like by diverse color expression.

Also, as shown in FIG. 2B, monitoring sensor units 7 are also arranged, together with the light output units 51 as the peripheral illumination unit 5. The monitoring sensor unit 7 is an imaging unit having a camera, for example. As shown in FIG. 2A, in order to perform image capturing in the peripheral direction of the roof module 1, the eight monitoring sensor units are arranged at a right part of a front part of the vehicle, a left part of the front part, a front part of a right-side part, a rear part of the right-side part, a front part of a left-side part, a rear part of the left-side part, a right part of a rear part of the vehicle and a left part of the rear part of the vehicle. This arrangement is to set an angle of view in a horizontal direction of the camera of each monitoring sensor unit 7 to about 50° and to perform capturing in the entire peripheral direction by the eight monitoring sensor units 7.

In FIG. 2B, an example where one monitoring sensor unit 7 has a visible light camera 7a and a far-infrared light camera 7b is shown. However, this is simply exemplary. The monitoring sensor unit 7 includes at least the camera having the visible light camera 7a, so that it is possible to recognize a peripheral environment by an image and to recognize a person, an object and colors thereof. The far-infrared light camera 7b is included, so that it is possible to favorably recognize a heat source body such as a person and an animal.

Also, as the cameras, stereo cameras that are used as a pair of right and left cameras are mounted, so that it is also possible to obtain distance information to a target by using a triangulation principle.

Also, the monitoring sensor unit 7 may have a near-infrared light camera. Also, the monitoring sensor unit 7 may have a laser sensor and a radar sensor without the cameras or in addition to the cameras.

The headlight unit 3, the rear light unit 4 and the peripheral illumination unit 5 provided to the roof module 1 are respectively configured to output laser light, as the illuminating light. In one or more embodiments of the present invention, the headlight unit 3, the rear light unit 4 and the peripheral illumination unit 5 do not independently have a laser diode and the like as the laser light source, respectively. Instead, laser light that is to be generated from the laser light engine 2 is used.

That is, the laser light generated from the laser light engine 2 is guided to the high beam output unit 3H, the low beam output unit 3L and the spot beam output unit 3S of the headlight unit 3 by optical fibers 6 serving as a light guiding path and is output therefrom.

Also, likewise, the laser light generated from the laser light engine 2 is guided to the rear beam output unit 4H, the brake lamp unit, the rear lamp unit and the like (not shown) of the rear light unit 4 by the optical fibers 6 and is output therefrom.

Also, likewise, the laser light generated from the laser light engine 2 is guided to the respective light output units 51 of the peripheral illumination unit 5 by the optical fibers 6 and is output therefrom.

The optical fibers 6 are provided in a three-system in correspondence to each of the R laser light, the G laser light, the B laser light. The optical fibers 6 of three-system are partially exposed to an upper surface and side surfaces of the roof module 1, as shown in FIGS. 1 and 2A, so that the optical fibers 6 (the respective RGB lights to be transmitted by the optical fibers 6) configure a part of an exterior appearance design of the roof module 1.

In the meantime, the configuration where the headlight unit 3, the rear light unit 4 and the peripheral illumination unit 5 use the laser light generated from the laser light engine 2 is merely an example.

The headlight unit 3, the rear light unit 4 and the peripheral illumination unit 5 may independently have a light source such as a laser diode, an LED (Light Emitting Diode) and the like, respectively.

Also, a part of the headlight unit 3, the rear light unit 4 and the peripheral illumination unit 5 may use the laser light generated from the laser light engine 2 and a part may use an independent light source.

<Control Configuration>

Figure 3:
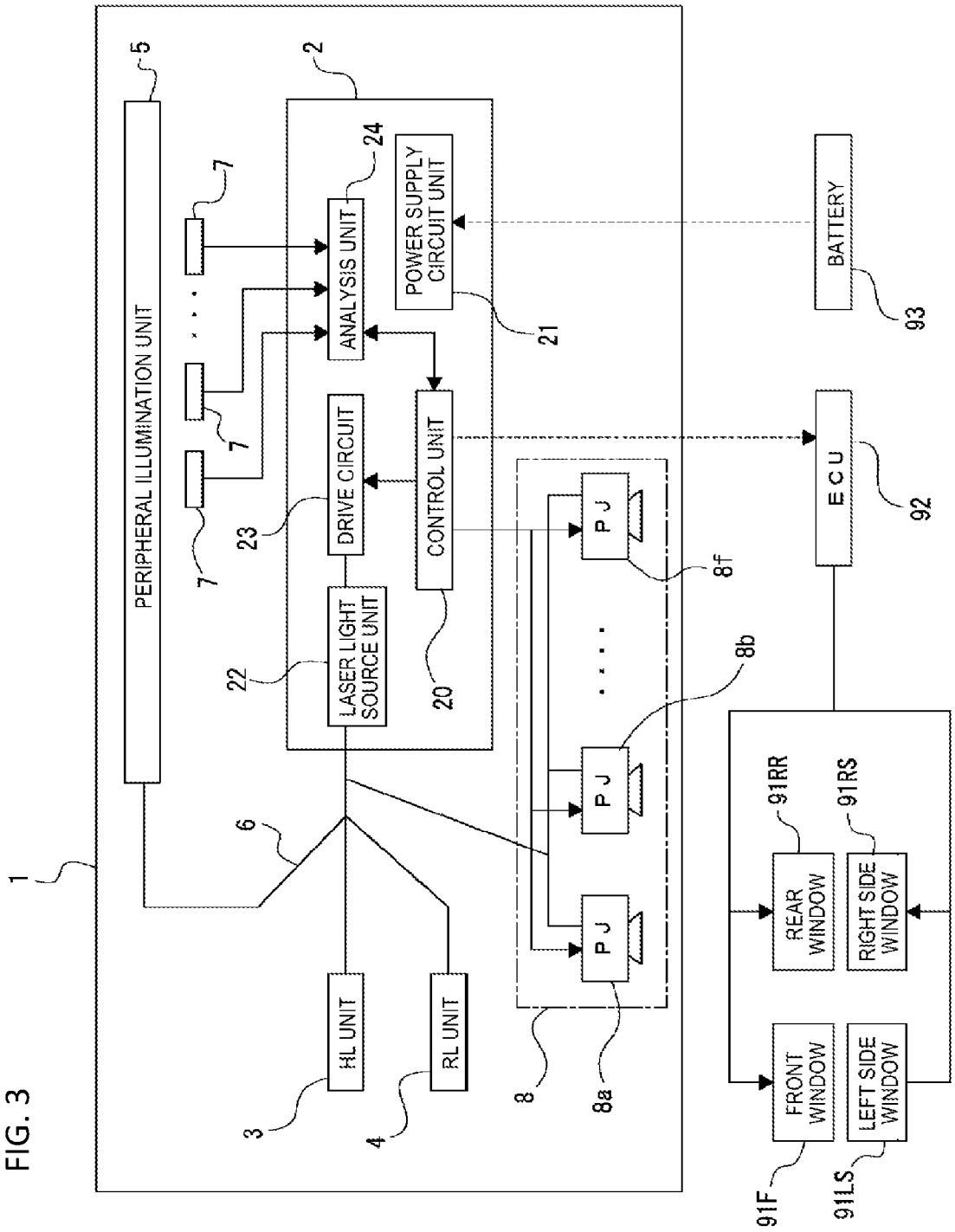
FIG. 3 is a block diagram depicting a configuration of main parts according to one or more embodiments of the present invention.

FIG. 3 depicts an internal configuration of the roof module 1 and a configuration of the vehicle 90 associated with an operation of the roof module 1.

An ECU (electronic control unit) 92 is a microcomputer configured to perform a variety of controls in the vehicle 90. The ECU 92 is configured to perform traveling control, automatic driving control, driving support control, and electric system device control of the vehicle 90, for example.

A battery 93 is a battery of the vehicle 90 and is configured to supply operating power supply voltages of a traveling system, an electric system, a control system and other units.

The front window 91F, the left side window 91LS, the right side window 91RS, and the rear window 91RR are peripheral windows of the vehicle interior, and have a function as a screen for displaying a vehicle interior image and a vehicle exterior image, for example. In one or more embodiments of the present invention, the ECU 92 is configured to variably control transmissivity of each window 91 (91F, 91RS, 91LS, 91RR).

Each window 91 is configured so that the transmissivity can be uniformly changed as a whole of the window or different transmissivities can be set for each region in the window by the ECU 92. The ECU 92 is configured to control the transmissivity of each window 91 on the basis of information from a control unit 20 of the roof module 1, for example. In the meantime, instead of the ECU 92, the control unit 20 may be configured to directly control the transmissivity of each window 91.

As shown in FIGS. 1 and 2A, the roof module 1 is provided with the laser light engine 2, the headlight unit 3, the rear light unit 4, the peripheral illumination unit 5, the optical fibers 6, and the monitoring sensor units 7. Further, as shown in FIG. 3, the roof module 1 is provided with an image projection unit 8.

The laser light engine 2 of the roof module 1 is provided with the control unit 20, a power supply circuit unit 21, a laser light source unit 22, a drive circuit 23, and an analysis unit 24.

The control unit 20 consists of a microcomputer and is configured to control an illumination operation of the roof module 1, an operation relating to captured image processing for monitoring a periphery of the vehicle 90, a display operation, and the like. Also, the control unit 20 can acquire vehicle information by communication with the ECU 92 and request the ECU 92 to execute processing (for example, the transmissivity control, and the like). Also, the control unit 20 can provide the periphery information obtained by the monitoring sensor unit 7 to the ECU 92.

For communication between the control unit 20 and the ECU 92, near field communication, wired communication, infrared communication and other diverse communication methods can be applied. Considering the configuration where the roof module 1 is arranged on an upper surface of each window 91, it is assumed that the ECU 92 is arranged at a lower part (a part lower than the window 91) of the vehicle. Like this example, when the window 91 is formed over the substantially entire circumference, it is considered that a transparent transmission path is formed at a part of the window 91 or the corner part 95, which is a boundary of each window 91, and is used as a communication path so as to enable the control unit 20 and the ECU 92 to perform communication with each other in a wired method.

The power supply circuit unit 21 is fed with power from the battery 93 and is configured to generate an operating power supply voltage necessary for each unit of the roof module 1. That is, the power supply circuit unit is configured to generate a power supply voltage necessary for each of the control unit 20, the drive circuit 23, the analysis unit 24, the headlight unit 3, the rear light unit 4, the peripheral illumination unit 5, the monitoring sensor units 7 and the image projection unit 8, and to supply the same to each unit. Depending on the configurations of the headlight unit 3, the rear light unit 4 and the peripheral illumination unit 5, the power supply circuit unit 21 may supply the power supply voltage to the same.

It is considered that the power feeding from the battery 93 to the power supply circuit unit 21 is performed by wireless power feeding. Alternatively, a part of the window 91 or the corner part 95 may be formed with a transparent power feeding path for power feeding.

In the meantime, it is also considered that a solar panel is arranged on the upper surface of the roof module 1 and power generated from the solar panel is used as the operating power of the roof module 1.

In this case, the power supply circuit unit 21 includes an electricity storage configured to store charges generated from the solar panel, and is configured to generate a power supply voltage necessary for each unit by using a power supply voltage from the electricity storage and to supply the same to each unit. In this case, the power fed from the battery 93 and the power from the electricity storage may be used in parallel, and the power feeding from the battery 93 may be omitted.

The laser light source unit 22 includes laser light sources such as laser diodes, for example, and is configured to output laser light. Here, R laser light, G laser light, and B laser light are respectively output by three laser light sources. The respective RGB laser lights are transmitted to the peripheral illumination unit 5, the headlight unit 3 and the rear light unit 4 by the optical fibers 6, respectively.

The drive circuit 23 is a circuit configured to drive the respective RGB laser light sources of the laser light source unit 22. For example, the drive circuit includes a current supply circuit to the laser diodes, a current stabilizing circuit, a protection circuit and the like. The drive circuit 23 is configured to enable the laser light source unit 22 to output the laser light, in accordance with an instruction of the control unit 20.

The analysis unit 24 is an image analysis unit, for example, and is configured to input therein captured image data from the cameras (the visible light camera 7a and the far-infrared light camera 7b) of each of the eight monitoring sensor units 7 configured to perform imaging for monitoring the periphery of the vehicle 90, as described above, and to perform an image analysis for each data. In this case, the analysis unit 24 can recognize a peripheral person and a peripheral object, for example, a building, a road situation, a traffic light, a mark, a guardrail, an obstacle, a leading vehicle, an oncoming vehicle and the like by analyzing the captured image from the visible light camera 7a of each monitoring sensor unit 7. Also, the analysis unit can recognize a weather, a sunshine direction and the like. Also, the analysis unit 24 can recognize a peripheral temperature distribution by analyzing an image from the far-infrared light camera 7b, and use the same for recognition aid by the visible light camera 7a.

In the case that the monitoring sensor unit 7 is provided with a laser sensor and a radar sensor, the analysis unit 24 analyzes detection signals of the sensors to obtain a variety of information.

The control unit 20 can execute a variety of controls, based on the recognition information of the peripheral environment obtained by the image analysis and detection signal analysis of the analysis unit 24.

The roof module 1 is provided with the image projection unit 8. The image projection unit 8 has six projectors 8a to 8f, for example. The projectors 8a to 8f are arranged to project images from a bottom side of the roof module 1 to each window 91, for example.

As projection light sources of the projectors 8a to 8f, the RGB laser lights from the laser light source unit 22 are used. To this end, the respective RGB laser lights are supplied to the respective projectors 8a to 8f by the optical fibers 6.

The operations of the respective projectors 8a to 8f are controlled by the control unit 20. That is, a projection operation and a display content are instructed by the control unit 20.

In the meantime, the projectors 8a to 8f may have independent projection light sources. Also, the projectors 8a to 8f may be arranged in the vehicle interior, independently of the roof module 1.

<Illumination/Monitoring>

The illumination and monitoring to be performed by the headlight unit 3, the rear light unit 4 and the peripheral illumination unit 5 are described.

The headlight unit 3 is provided to the roof module 1. Therefore, the illumination is performed from the upper of the vehicle 90 toward the front in a state where an angle of an optical axis relative to a road surface is larger than the related art. In this way, the illumination is performed from the relatively upper position, so that it is possible to increase the visibility of the road surface by the passenger.

Since the rear light unit 4 is also provided to the roof module 1 and the illumination is performed from the relatively upper position, it is possible to increase the visibility of the rear road surface.

As described with reference to FIG. 2, the peripheral illumination unit 5 has the light output units 51 arranged at the periphery of the roof module 1, so that it is possible to illuminate the 360° region around the vehicle 90.

The light distribution of each light output unit 51 in the vertical direction is configured to be lower than a horizontal direction of the roof module 1.

Figure 4A:
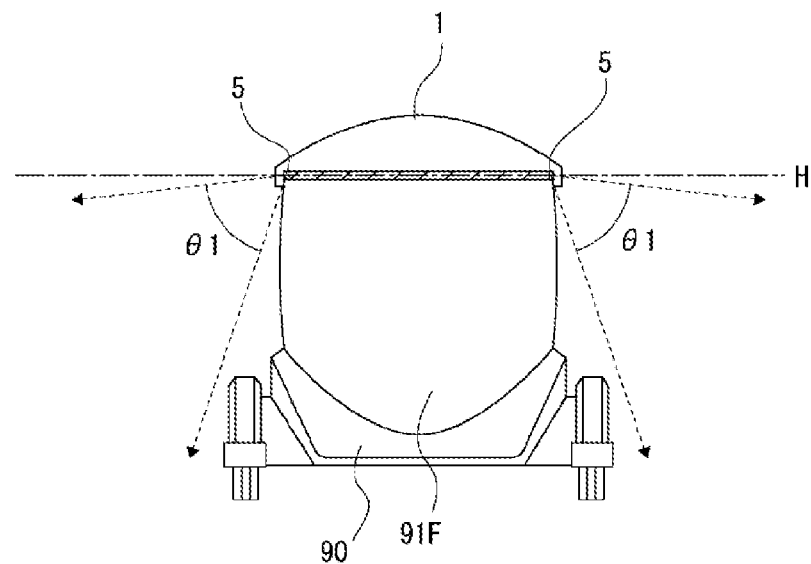
FIGS. 4A and 4B illustrate light distribution of a peripheral illumination unit according to one or more embodiments of the present invention and a photographic subject direction of an imaging unit.

For example, FIG. 4A depicts the horizontal direction of the roof module 1 with a dashed-dotted line H. In contrast, a light emission direction of the light output unit 51 arranged in the peripheral illumination unit 5 is set to be within a range of an angle $\theta 1$ shown with a broken line, for example. By this light distribution, it is possible to illuminate a peripheral region of about 10 m.

By the light distribution, it is possible to prevent glare from being irradiated to a far person. Also, a person adjacent to the vehicle 90 is prevented from unconsciously looking directly at the light from the peripheral illumination unit 5. Meanwhile, in a case where a position of an eye is low, such as a child, a person may unconsciously look directly at the light. Therefore, when a person is recognized as a result of the periphery environment monitoring, it is considered to stop the light output from the light output unit 51 toward the person or to change the light distribution.

Also, the vehicle 90 itself becomes an infrastructure at a corresponding place by the illumination of the peripheral illumination unit 5, so that the periphery is illuminated. When there is a plurality of the vehicles 90 in an urban area and the like, it is possible to implement a bright environment even at night.

Also, when a road surface is drawn by color light sources of the peripheral illumination unit 5, it is possible to provide the peripheral persons with information or diverse notifications.

Meanwhile, in one or more embodiments of the present invention, the peripheral illumination unit 5 is configured to illuminate the periphery of the roof module 1 from the upper of the vehicle 90. However, the peripheral illumination unit 5 may be provided at a periphery of a bottom part of the vehicle body. That is, the light output units 51 arranged as the peripheral illumination unit 5 is not limited to the configuration where they are provided to the roof module 1.

Also, the peripheral illumination unit 5 may not be configured to necessarily illuminate the entire circumference of 360° direction. For example, the peripheral illumination unit may be configured to illuminate only sides, only sides and rear, only a left side, only a right side and the like. Also, the peripheral illumination unit may be configured to illuminate a region of 300° direction, 250° direction and the like, as the substantially entire circumference.

An example of a method of supplying the laser light to the light output unit 51 (the R laser light output unit 5R, the G laser light output unit 5G and the B laser light output unit 5B) of the peripheral illumination unit 5 is described with reference to FIG. 5.

Figure 5:
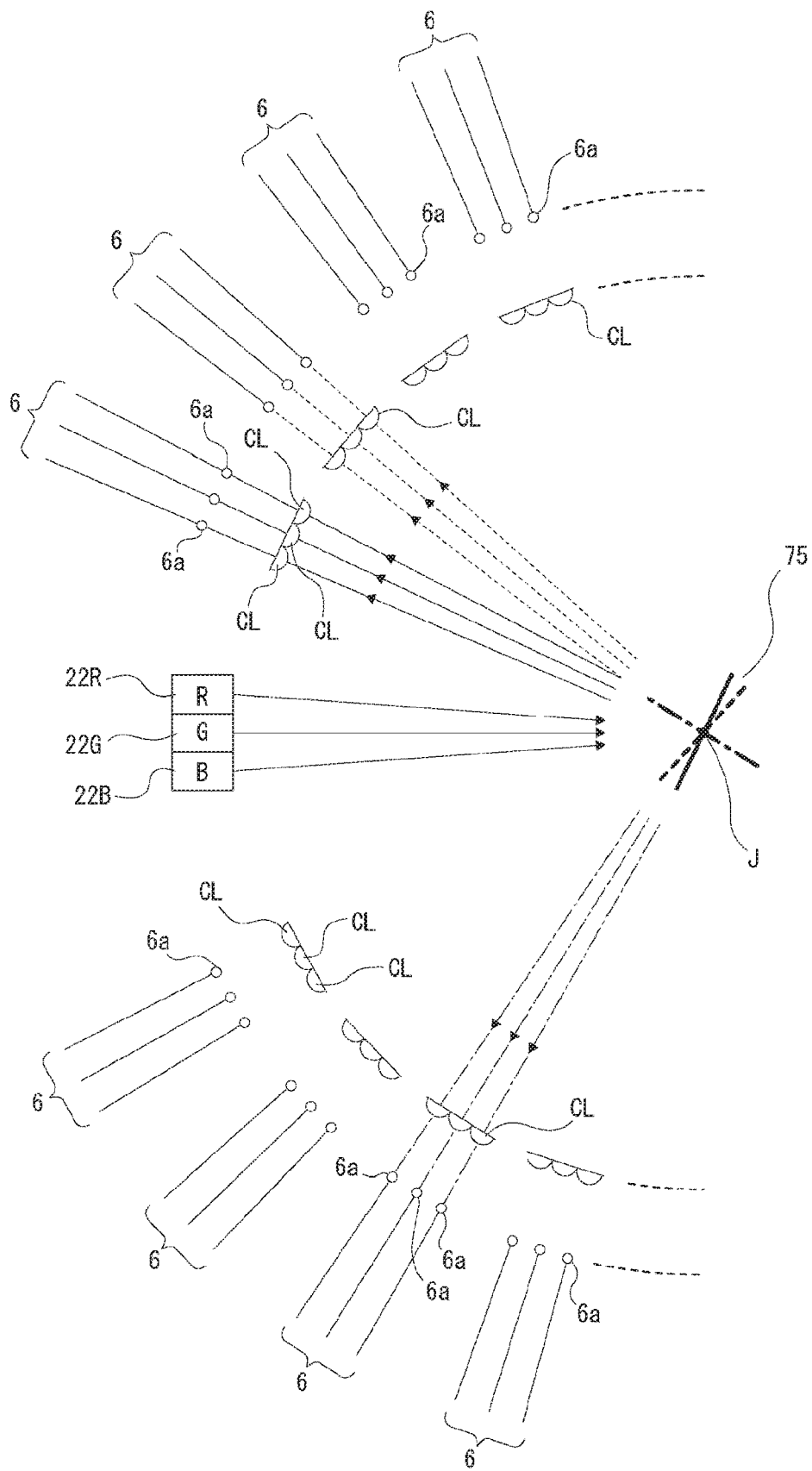
FIG. 5 illustrates laser light supply to the peripheral illumination unit according to one or more embodiments of the present invention.

FIG. 5 depicts RGB laser diodes 22R, 22G, 22B of the laser light source unit 22 of the laser light engine 2. The respective emitted lights of the laser diodes 22R, 22G, 22B are irradiated to a rotating reflective plate 75. The rotating reflective plate 75 is configured to rotatively drive about an axis J.

In the meantime, here, the rotating reflective plate 75 is a flat plate-shaped both-sided mirror. However, instead of the rotating reflective plate 75, a polygon mirror consisting of a polyhedral mirror may be used.

Collimator lenses CL and the optical fibers 6 are arranged around the rotating reflective plate 75. The laser light made to be parallel light by the collimator lens CL enters the optical fiber 6 from an incidence end 6a.

Here, the three optical fibers 6 corresponding to one set of the three collimator lenses CL correspond to one light output unit 51 of the peripheral illumination unit 5.

For example, when the rotating reflective plate 75 is in a state shown with a solid line, the respective RGB laser lights reflected on the rotating reflective plate 75 are introduced into one set (three) of the optical fibers 6 by any one set (three) of the collimator lenses CL, as shown with solid lines. The three optical fibers 6 supply the laser lights to the respective laser light output units (5R, 5G, 5B) of any one light output unit 51 of the peripheral illumination unit 5.

Also, when the rotating reflective plate 75 is in a state shown with a broken line, the respective RGB laser lights reflected on the rotating reflective plate 75 are introduced into one set of the optical fibers 6 by any one set of the collimator lenses CL, as shown with broken lines. The three optical fibers 6 supply the laser lights to the respective laser light output units (5R, 5G, 5B) of one separate light output unit 51 of the peripheral illumination unit 5.

Also, when the rotating reflective plate 75 is in a state shown with a dashed-dotted line, the respective RGB laser lights reflected on the rotating reflective plate 75 are introduced into one set (three) of the optical fibers 6 by any one set (three) of the collimator lenses CL, as shown with dashed-dotted lines. The three optical fibers 6 supply the laser lights to the respective laser light output units (5R, 5G, 5B) of one separate light output unit 51 of the peripheral illumination unit 5.

Accordingly, it is possible to distribute the laser lights to the respective light output units 51 of the peripheral illumination unit 5 by rotating the rotating reflective plate 75 at high speed while outputting the respective RGB laser lights from the respective RGB laser diodes 22R, 22G, 22B of the laser light source unit 22. Thereby, it is possible to implement the illumination in the 360° direction even though each light output unit 51 of the peripheral illumination unit 5 is not provided with light source elements such as laser diodes.

Also, it is possible to perform the illumination only in a specific direction or to turn off the illumination only in the specific direction by turning on and off the laser irradiation to the rotating reflective plate 75 in synchronization with rotation positions of the rotating reflective plate 75.

Also, it is possible to change a color of the illuminating light of the peripheral illumination unit 5 by controlling light intensities of the respective RGB laser lights to be irradiated to the rotating reflective plate 75.

Also, it is possible to change a color of the illuminating light of the peripheral illumination unit 5 in a specific direction by controlling the light intensities of the respective RGB laser lights to be irradiated to the rotating reflective plate 75 in synchronization with rotation positions of the rotating reflective plate 75.

In the meantime, as pictorially shown in FIG. 5, the emitted laser lights of the laser diodes 22R, 22G, 22B are directly irradiated to the rotating reflective plate 75. However, actually, the irradiation may be performed via a necessary optic system.

For example, the emitted laser lights of the laser diodes 22R, 22G, 22B are incident on the other optical fibers 6 for supply to the headlight unit 3 and the rear light unit 4, as well. Therefore, it is favorable that the emitted laser lights of the laser diodes 22R, 22G, 22B are dispersed by an optic element such as a beam splitter and parts thereof are irradiated to the rotating reflective plate 75, as lights for the peripheral illumination unit 5, as shown in FIG. 5.

Also, the laser diodes 22R, 22G, 22B may be configured as dedicated laser diodes for light supply to the peripheral illumination unit 5.

Subsequently, the monitoring sensor unit 7 is described. As described above, it is possible to recognize the peripheral person and object by the monitoring of the monitoring sensor unit 7. When the monitoring sensor unit 7 includes the visible light camera 7a and the far-infrared light camera 7b, it is possible to increase the recognition accuracy of a person. In a captured image obtained by the visible light camera 7a, a person can be recognized by a method such as pattern matching and the like. In addition to this, when a captured image obtained by the far-infrared light camera 7b is used to determine a temperature of a target part, it is possible to more accurately recognize whether the target is a person or not. This also applies to an animal.

Figure 4B:
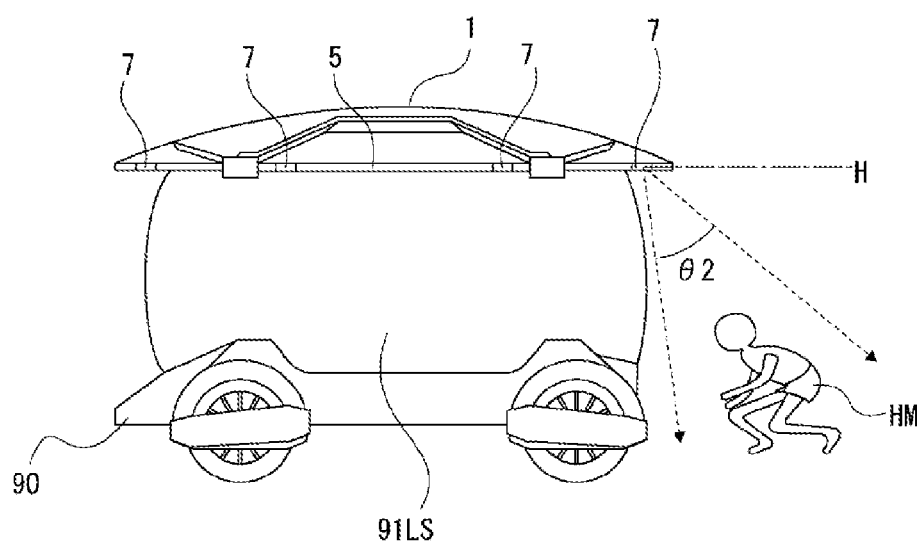

Considering an safety aspect, it is also important to monitor the vicinity of the vehicle 90. For example, as shown in FIG. 4B, the monitoring sensor unit 7 provided at the rear part of the vehicle 90 is arranged so that an angle of view in the vertical direction is below the horizontal direction (the dashed-dotted line H) of the roof module 1, for example, within a range of θ2. By doing so, it is possible to always recognize a child HM and the like behind the vehicle 90.

By the monitoring sensor unit 7, it is possible to improve the safety by adopting the above configuration.

In one or more embodiments of the present invention, the illumination of the peripheral illumination unit 5 is used to improve the monitoring function as well.

When performing the imaging by the monitoring sensor unit 7, a clearness degree of an outline of an image is changed by an illumination state. Thereby, the recognition accuracy of objects including a person is varied. Therefore, in order to further improve the image recognition accuracy, a color of the illuminating light by the peripheral illumination unit 5 is changed in accordance with the peripheral objects.

Since each light output unit 51 of the peripheral illumination unit 5 has the respective RGB laser light output units (5R, 5G, 5B), it is possible to output the illuminating lights of diverse colors.

Also, as described above, it is possible to irradiate the illuminating light of a specific color only in a specific direction by changing the intensities of the laser lights to be supplied to the specific laser light output units (5R, 5G, 5B).

In the meantime, even when each light output unit 51 has the light sources such as LEDs, laser diodes and the like, for example, it is possible to output the illuminating lights of diverse colors by arranging the LEDs and the like as the RGB light sources.

Figure 6:
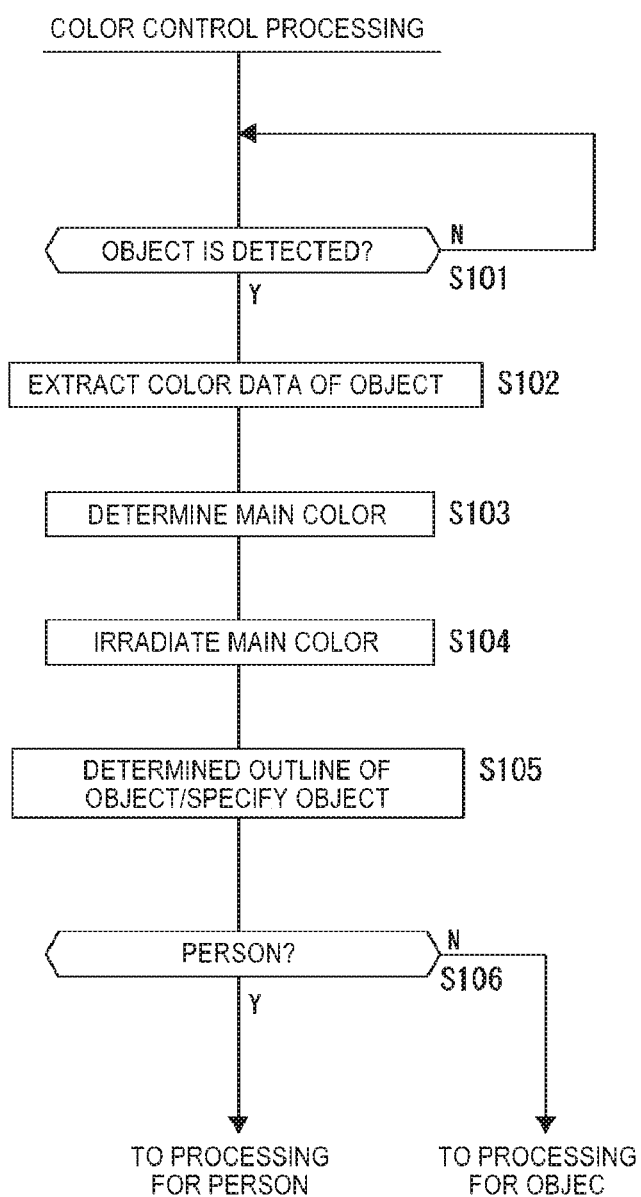
FIG. 6 is a flowchart depicting color control of illuminating light according to one or more embodiments of the present invention.

In order to improve the monitoring function, specifically, the illumination tailored to the color of the detected object is performed. Therefore, the control unit 20 is configured to execute color control processing shown in FIG. 6 with respect to the illumination of the peripheral illumination unit 5.

In step S101, the control unit 20 monitors whether any object is detected in any direction by the analysis unit 24. When any object is detected, the control unit 20 extracts color data of the object, in step S102. Specifically, the control unit acquires information of colors configuring the detected object from the analysis unit 24.

In step S103, the control unit 20 determines a main color from the acquired color data. For example, the control unit sets, as the main color, a dominant color, a color of the largest ratio or the like of the detected object.

In step S104, the control unit 20 performs control so that illumination of the determined main color is to be output from the detection direction of the object.

Specifically, the control unit first acquires information of the direction (direction seen from the vehicle body) of the detected object from the analysis unit 24, and specifies the light output unit 51 to perform illumination in the direction. Then, the control unit controls the respective intensities of the RGB laser lights to be supplied to the light output unit 51 so that the output light from the light output unit 51 has the main color.

By the above processing, when a person who wears red clothes is detected as the object, for example, red illumination is performed toward the person. Also, when a yellow object is detected, yellow illumination is performed toward the object.

In this way, the illumination is performed in conformity to the main color, so that the outline of the object becomes clear on the captured image obtained by the monitoring sensor unit 7. Thereby, the analysis unit 24 can accurately determine the outline of the object and accurately specify what the object is by the pattern matching and the like.

In step S105, the control unit 20 acquires an object specifying result made by the analysis unit 24. The processing is branched in step S106, depending on whether the object is a person or not. When the object is a person, processing for person is executed, and otherwise, processing for object is executed.

In this way, the illuminating light of color corresponding to the body to be detected is irradiated to the body to be detected, so that it is possible to improve the recognition accuracy as the exterior environment recognition.

In the meantime, the illumination of color tailored to the body to be detected is easily visually recognized by the person. For example, when a pedestrian wears blue clothes, blue illumination is irradiated, so that the visibility of the pedestrian to the driver is improved. Thereby, it is possible to improve the safety.

Also, in the case that the environment recognition accuracy has been improved, for example, when a person is recognized, a part of the peripheral illumination unit 5, i.e., the illumination in the direction facing toward the person is turned off or the illuminating light intensity is lowered. Thereby, it is possible to prevent the glare from being irradiated to a peripheral person, for example, so that it is possible to perform the more advanced control.

<Window Display>

An image display on each window 91 (the front window 91F, the left side window 91LS, the right side window 91RS and the rear window 91RR) is described.

Each window 91 is configured as a panel capable of controlling the transmissivity, and is formed as a completely transmissive window, so that each window functions as a window through which the passenger can usually recognize the periphery.

Also, on each window 91, it is possible to provide a display to the passenger in the vehicle interior by projecting an image from the image projection unit 8 and lowering the transmissivity of the projected part (a display of a vehicle interior image). Also, on each window 91, it is possible to provide a display a person outside the vehicle by projecting an image from the image projection unit 8 and increasing the transmissivity of the projected part (a display of a vehicle exterior image).

The respective projectors 8a to 8f of the image projection unit 8 are configured to perform image projection with being arranged as shown in FIG. 7, for example. The respective projectors 8a to 8f are arranged on a bottom surface of the roof module 1 so that projection directions as shown are to be obtained, for example.

An arrangement position of the projector 8a is set so that the image projection is performed on the entire front window 91F. An arrangement position of the projector 8b is set so that the image projection is performed on the entire rear window 91RR. An arrangement position of the projector 8c is set so that the image projection is performed on a substantial half range of the vehicle front-side of the right side window 91RS. An arrangement position of the projector 8d is set so that the image projection is performed on a substantial half range of the vehicle rear-side of the right side window 91RS. An arrangement position of the projector 8e is set so that the image projection is performed on a substantial half range of the vehicle front-side of the left side window 91LS. An arrangement position of the projector 8f is set so that the image projection is performed on a substantial half range of the vehicle rear-side of the left side window 91LS.

The respective projectors 8a to 8f of the image projection unit 8 are arranged as described above, so that it is possible to perform a variety of image displays on all the windows 91.

The respective projectors 8a to 8f may be configured to project an independent image, respectively, or to project partial images so that one continuous image is to be formed on the adjacent windows.

Figure 8:
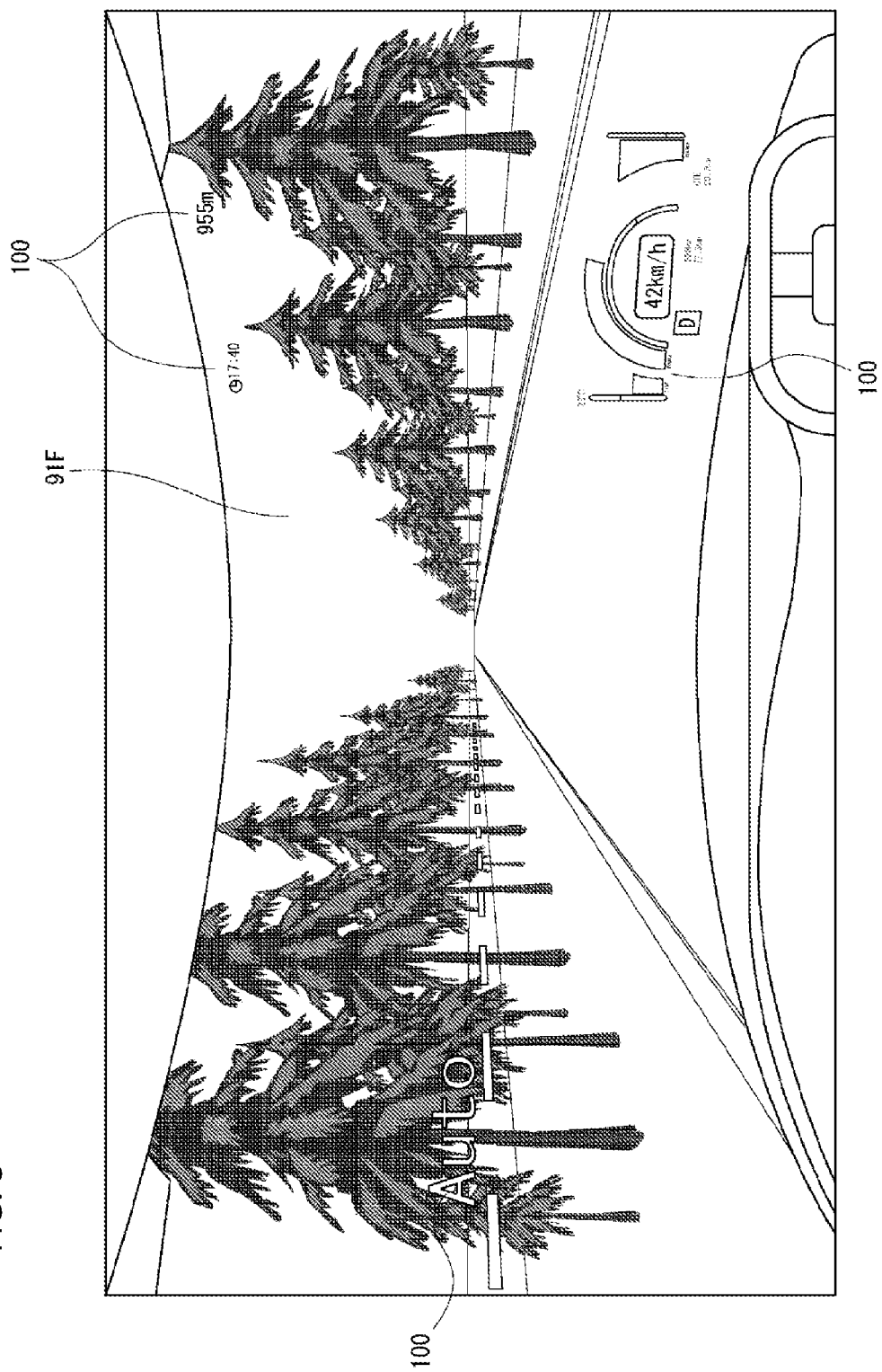
FIG. 8 illustrates a vehicle interior image that is projected on a front window according to one or more embodiments of the present invention.

FIG. 8 depicts a state where a vehicle interior image 100 is displayed on the front window 91F by the projector 8a. The front window 91F is mostly in a through-state (a state of transmissivity in which the window is visually recognized as substantially transparent), so that the passenger can see a scene in front of the vehicle. In this state, the transmissivity of the front window 91F is lowered at a part and a projection image of the projector 8a is displayed on the corresponding part. For example, a traveling speed, an RPM, a shift position, a traveling distance, time, a traveling mode and the like are displayed as the vehicle interior image 100.

In the meantime, in case of the full-automatic driving, it is not required that each window 91 (particularly, the front window 91F) should be always in the through-state for the passenger. Therefore, as the vehicle interior image 100, the transmissivity of each window 91 may be lowered to perform projection such as a screen image theater.

Also, one vehicle interior image 100 may be displayed over the adjacent windows 91, for example, the front window 91F and the left and right side windows (91LS, 91RS) by a large-scale screen. Also, an image may be projected on the four windows 91 as a 360° screen. The display on the plurality of the windows 91 can be performed by a setting of projection images of the projectors 8a to 8f. That is, one image may be divided in the horizontal direction and projected from the respective projectors 8a to 8f.

The display content of the vehicle interior image 100 using each window 91 as a screen is further described.

As the vehicle interior image 100, for example, a map image, a navigation image, a message image relating to a vehicle state, a notification of a peripheral situation, an alert image or character, diverse screen image contents, an enlarged image of a display screen of an information processing apparatus such as a portable terminal, a website image, and the like may be exemplified.

Figure 9:
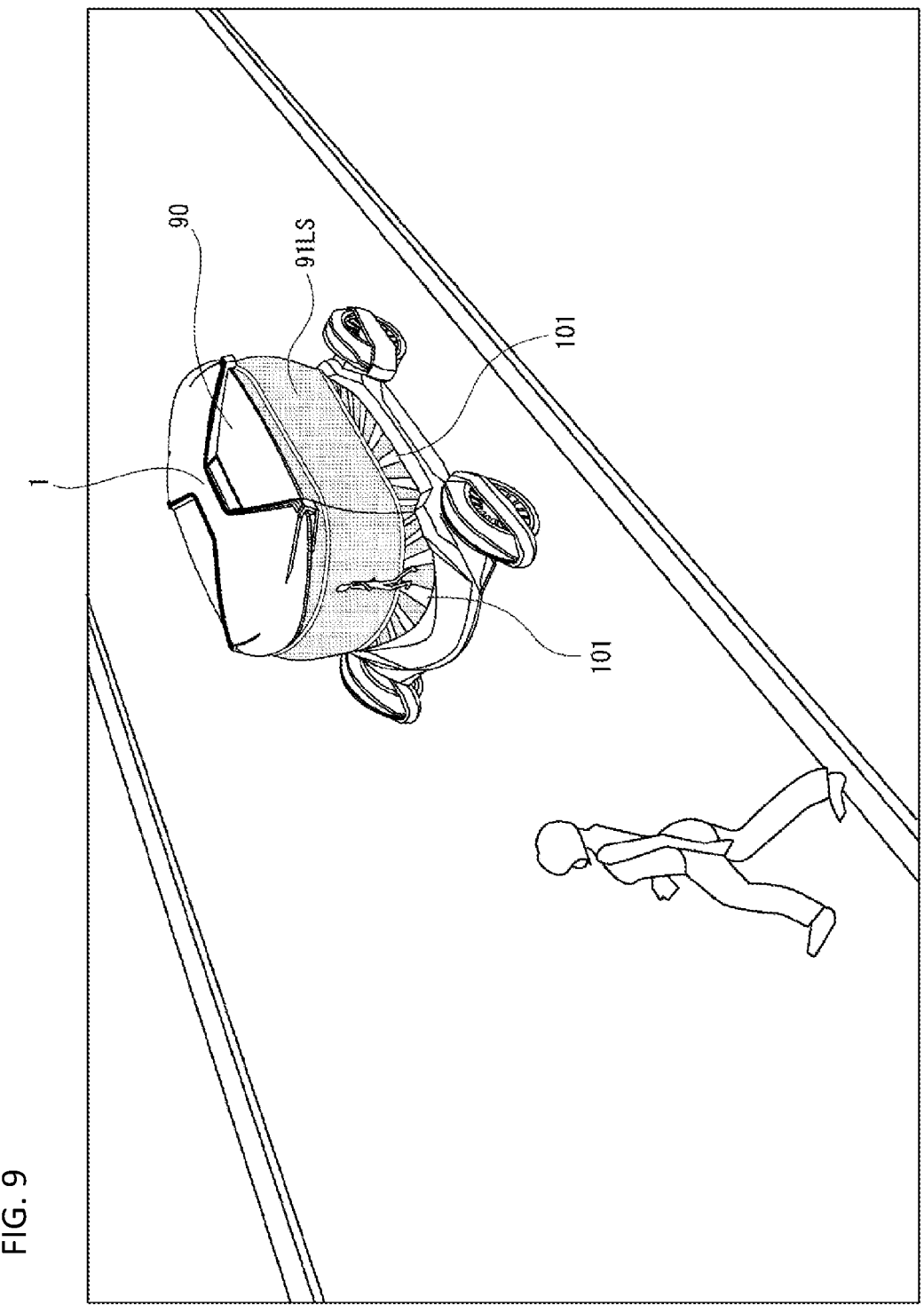
FIG. 9 illustrates a vehicle exterior image that is projected on the front window according to one or more embodiments of the present invention.

FIG. 9 depicts an example where a vehicle exterior image 101 is displayed on the front window 91F and the left side window 91LS by the projectors 8a, 8e, 8f, for example.

The front window 91F and the left side window 91LS have a structure capable of enabling a projected image to be visually recognized from the outside.

In the example of FIG. 9, an image for recommending a person who tries to cross a road to first cross the road is displayed using the front window 91F and the left side window 91LS. In particular, the front window 91F and the left side window 91LS are treated as one large-scale screen and the image is displayed over the windows, so that the visibility to the outside and the notification ability are improved.

The display content of the vehicle exterior image 101 using each window 91 as a screen is further described.

As the vehicle exterior image 101, notification information indicating whether there is a passenger in the vehicle 90, a display such as under pickup/under service/under return and the like, a message for a peripheral pedestrian and the like, a message or warning for a leading vehicle, a following vehicle and the like, an alert, an image for urging a person outside a vehicle to get in the vehicle, and the like are exemplified.

In the meantime, the vehicle interior image 100 and the vehicle exterior image 101 can also be projected at the same time.

An example of a method of displaying images on an inner surface and an outer surface of the window 91 by the projectors 8a to 8f mounted in the vehicle is described.

Figure 10A:
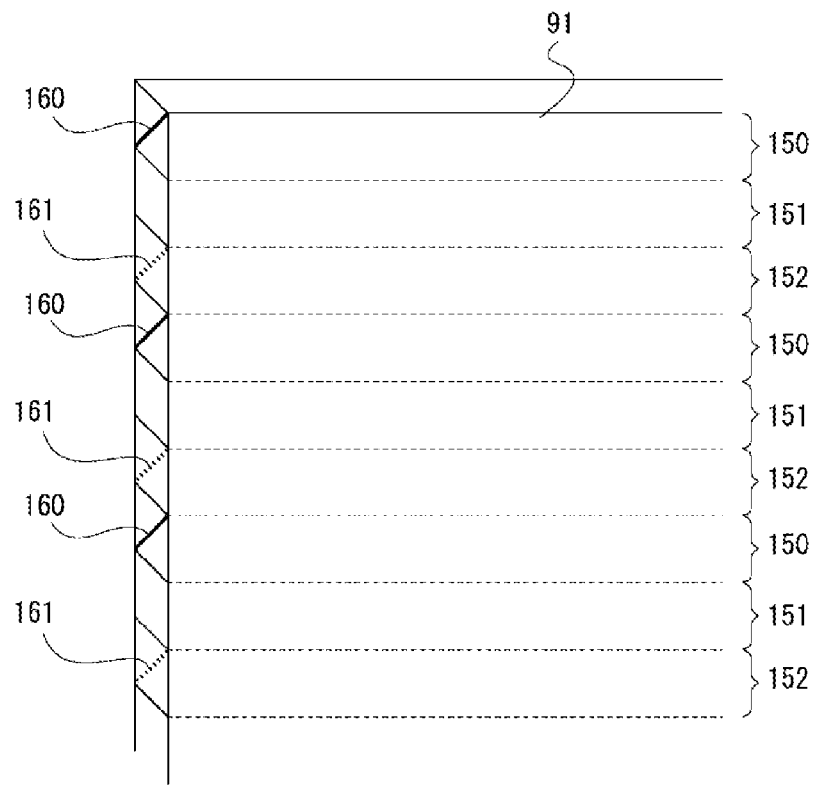
FIGS. 10A and 10B illustrate a window structure according to one or more embodiments of the present invention.
Figure 10B:
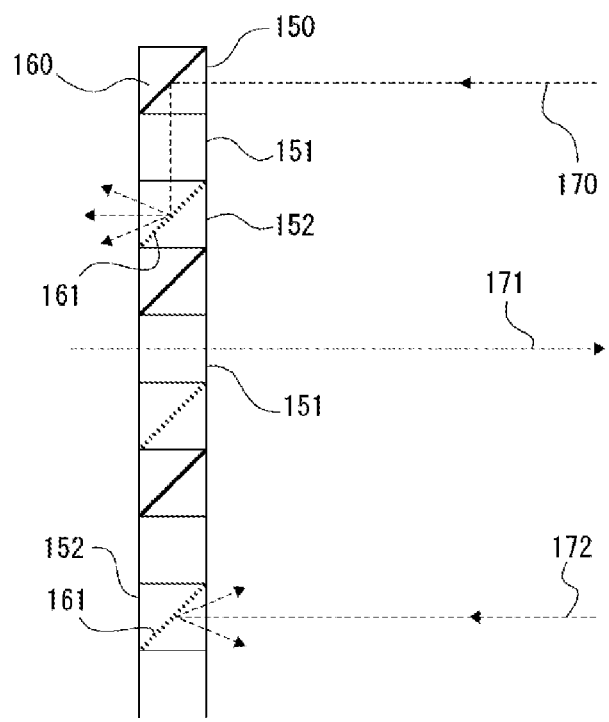

FIGS. 10A and 10B pictorially depict a structure of the window 91. As shown in FIG. 10A, the window 91 has a structure where it is divided into a plurality of line-shaped regions by horizontal division lines, for example. The divided regions are three types of a mirror region 150, a transmission region 151, and a diffusion region 152. A set of the mirror region 150, the transmission region 151 and the diffusion region 152 is continuously provided in a vertical direction, so that the window 91 is formed.

A vertical width of each region (150, 151, 152) may be a width of one to several lines, several tens of lines or multiple lines of a frame of an image to be projected, for example. The width may be set in accordance with a vertical resolution of an image or an image visibility. For descriptions, the vertical width of each region is denoted as a width of x lines of an image.

The mirror region 150 is a region in which a mirror 160 is formed. The mirror 160 is configured to reflect downward light incident from a direction in the vehicle interior.

The transmission region 151 is a region through which light is to penetrate with high transmissivity.

The diffusion region 152 is a region in which a diffusion plate 161 is provided.

In this case, as shown in FIG. 10B, light 170 incident on the mirror region 150 from the vehicle interior is reflected on the mirror 160, passes downward the transmission region 151 from above, and reaches the diffusion plate 161. The diffusion plate 161 is arranged with being inclined, as shown, so that the light 170 diffuses outward at the diffusion plate 161. In this state, an image formed by the light 170 is visually recognized from an outside of the window 91.

Also, light 171 from the vehicle exterior reaches the vehicle interior through the transmission region 151. Accordingly, the passenger can visually recognize a scene of the vehicle exterior.

Also, light 172 incident on the diffusion region 152 from the vehicle interior is projected to the diffusion plate 161 and diffuses. In this state, an image formed by the light 172 is visually recognized from an inner side of the window 91.

That is, the projectors 8a to 8f may emit the vehicle interior image 100 and the vehicle exterior image 101, as projection lights, as follows.

In frame data of the vehicle interior image 100, a first x line of a frame is set to blank (pixel data of zero gradation), a next x line is also set to blank, and pixel data configuring an image is arranged at a next x line. Such data arrangement is vertically repeated to form each frame data. Then, the projection is performed on the basis of the frame data. Then, the projection light configuring an image is projected to the diffusion region 152, so that the passenger can visually recognize an image.

In frame data of the vehicle exterior image 101, pixel data configuring an image is arranged at a first x line of a frame, a next x line is set to blank, and a next x line is also set to blank. Such data arrangement is vertically repeated to form each frame data. Then, the projection is performed on the basis of the frame data. Then, the projection light configuring an image is projected to the mirror region 150, so that an image can be visually recognized from an outside.

When displaying the vehicle interior image 100 and the vehicle exterior image 101 on the front and rear surfaces of the window, the vehicle interior image data and the vehicle exterior image data are synthesized. That is, in frame data of a synthesized image, pixel data configuring the vehicle exterior image 101 is arranged at a first x line of a frame, a next x line is set to blank, and pixel data configuring the vehicle interior image 100 is arranged at a next x line. Such data arrangement is vertically repeated to form each frame data, and then the projection is performed.

In the above method, projection positions of the projectors 8a to 8f should be accurately matched to positions of the regions (150, 151, 152) of the window 91. Therefore, according to one or more embodiments of the present invention, a camera capable of recognizing an image display state on the window 91, a light quantity sensor or the like is provided in the vehicle, and a projection position is automatically adjusted in a projected state of the vehicle interior image 100 so that the vehicle interior image 100 can be favorably displayed. In the above configuration, when the vehicle interior image 100 is set to a state in which it is to be appropriately displayed, as a positional relation, the vehicle exterior image 101 can also be appropriately projected.

Another method of displaying images inside and outside the window 91 is described with reference to FIGS. 11A, 11B and 12.

Figure 11A:
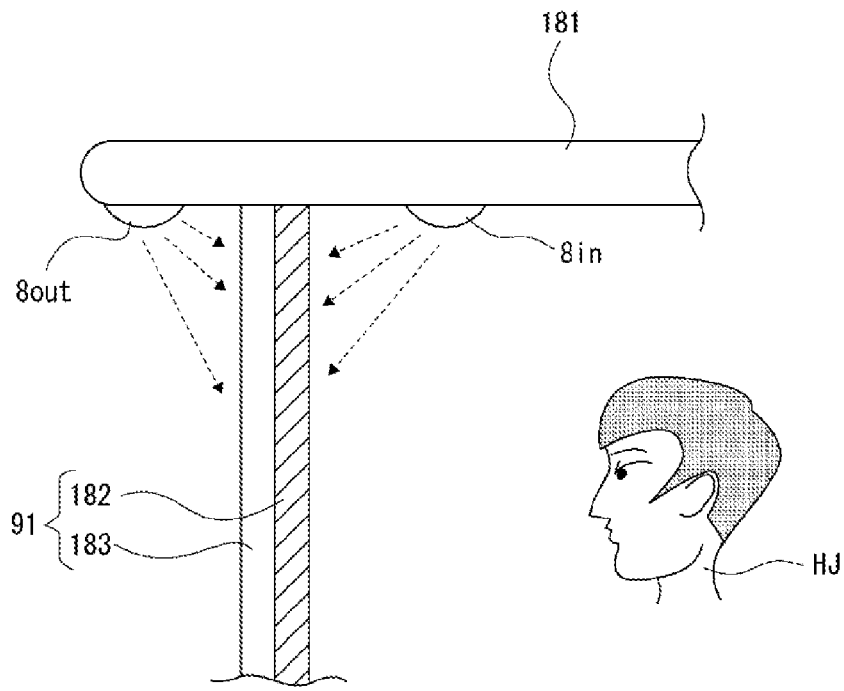
FIGS. 11A and 11B illustrate a display operation of the vehicle interior and vehicle exterior according to one or more embodiments of the present invention.

FIG. 11A depicts an example where projectors Bin (for example, the projectors 8a to 8f) are arranged inside the vehicle and projectors Bout are additionally arranged outside the vehicle, for example, at an awning part of a ceiling part 181 of the roof module 1.

The window 91 has a two-layered structure where a vehicle exterior side is referred to as a window part 183 and a vehicle interior side is referred to as a liquid crystal shutter part 182. The liquid crystal shutter part 182 is a layer of which transmissivity varies by a voltage to be applied to both end electrodes of enclosed liquid crystals.

By the above structure, according to one or more embodiments of the present invention, the vehicle interior image 100 is projected by the projectors 8in, and the vehicle exterior image 101 is projected by the projectors 8out. At the image projection parts by the projectors 8in, 8out, the transmissivity of the liquid crystal shutter part 182 is lowered. That is, the control unit 20 requests the ECU 92 to control the transmissivity of a region to which the vehicle exterior image 101 is to be projected and a region to which the vehicle interior image 100 is to be projected, as regions on each window 91, thereby controlling the transmissivity for each region of the window 91. The control unit instructs the image projection unit 8 to project an image to each region. In this way, it is possible to appropriately display the vehicle interior image 100 and the vehicle exterior image 101, respectively.

Figure 12:
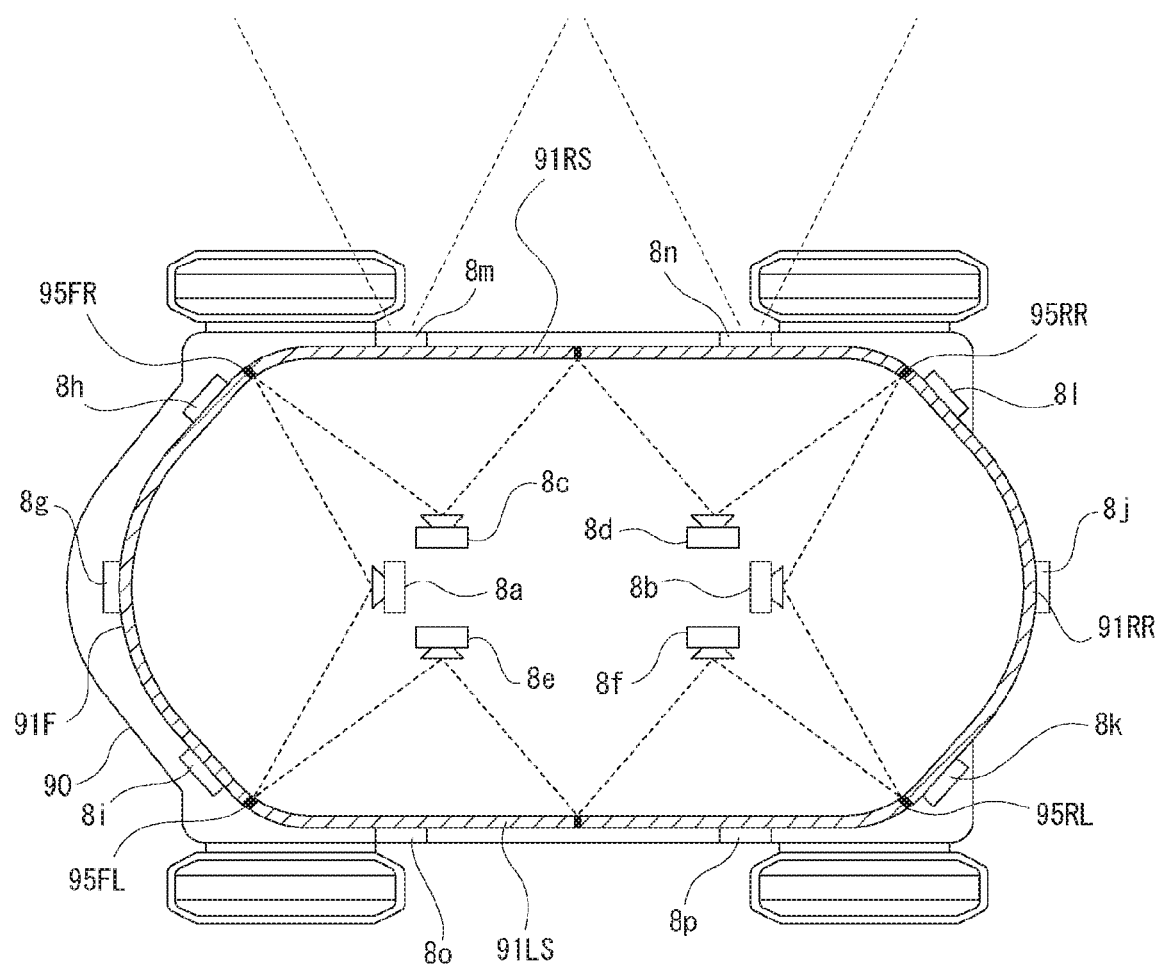
FIG. 12 illustrates arrangement of projectors for vehicle exterior according to one or more embodiments of the present invention.

FIG. 12 depicts an example of arrangement positions of the projectors Bout of the vehicle exterior. For example, the 10 projectors Bout are arranged as projectors 8g to 8p. For example, projectors 8g, 8h, 8i configured to perform projection onto the front window 91F, projectors 8j, 8k, 8l configured to perform projection onto the rear window 91RR, projectors 8m, 8n configured to perform projection onto the right side window 91RS, and projectors 8o, 8p configured to perform projection onto the left side window 91LS are provided, so that it is possible to make a display in the entire circumferential direction of the vehicle 90 by the projectors.

When the projectors 8out are provided in this way, it is also possible to draw a road surface by the projectors 8out. In FIG. 12, a state where the projectors 8m, 8n perform projection onto a road surface is shown with broken lines. However, it is possible to present notification to a person outside the vehicle by changing the projection direction and displaying diverse images on the road surface. For example, a guide for getting in or out a vehicle may be displayed on the road surface.

Figure 11B:
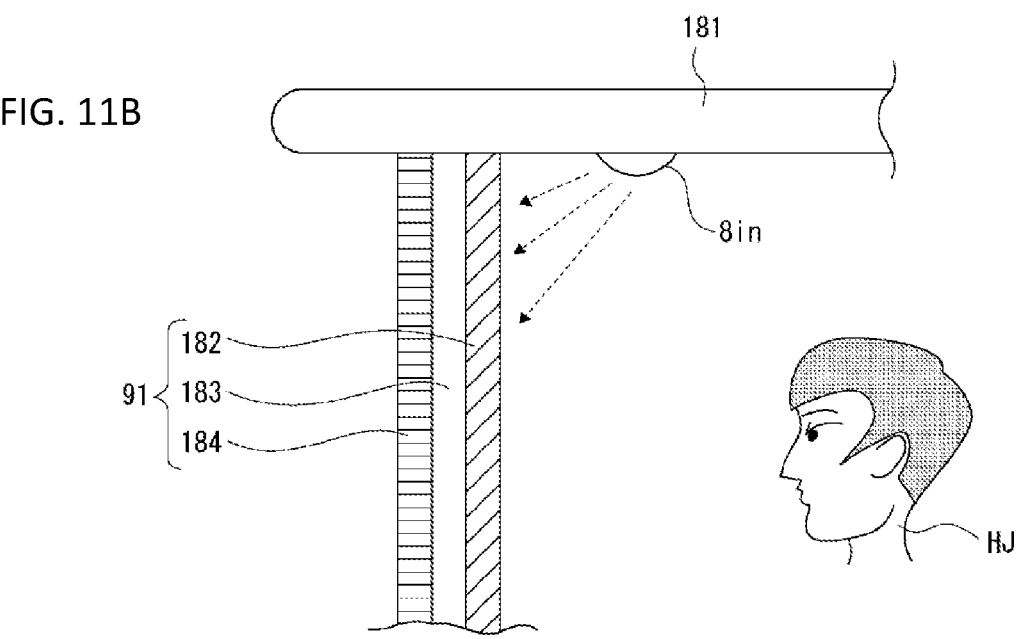

FIG. 11B depicts an example of other structure. The window 91 has a three-layered structure where a transmissive OLED (Organic Electro-Luminescence Display) part 184, a window part 183 and a liquid crystal shutter part 182 are formed in order from the vehicle exterior side. In this case, the vehicle interior image 100 is projected by the projectors 8in (for example, the projectors 8a to 8f) and the vehicle exterior image 101 is displayed by the transmissive OLED part 184. Also in this structure, it is possible to display an image inside and outside the vehicle. Also, since the transmissive OLED part 184 is used and the transmissive property of the window 91 is thus secured, the exterior visibility of the passenger is also kept.

Although the diverse window structures and display devices (the projectors and OLED) have been described, there are a variety of methods of displaying an image inside and outside the vehicle by the window 91.

Figure 13A:
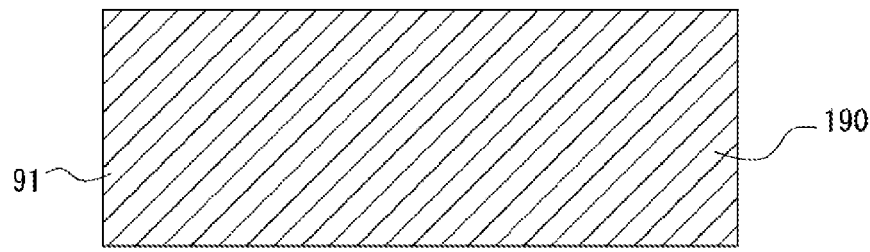
FIGS. 13A, 13B and 13C illustrate a region setting of a window according to one or more embodiments of the present invention.

Also, in the structure example of the window 91, a display region 190 shown with diagonal lines in FIG. 13A may be applied to the entire window 91, for example. Thereby, it is possible to improve a degree of freedom of the image display and to implement a large-scale screen.

Figure 13B:
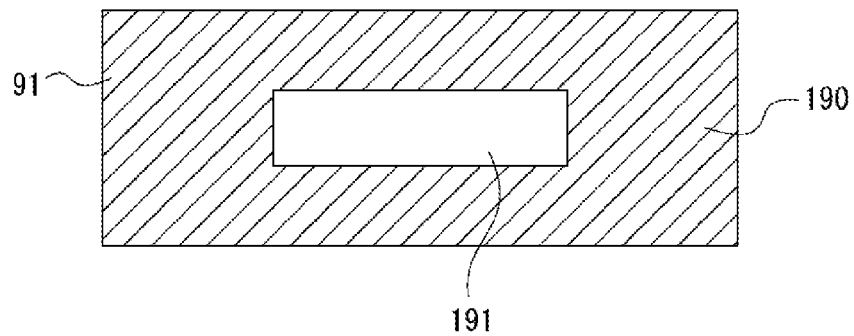
Figure 13C:
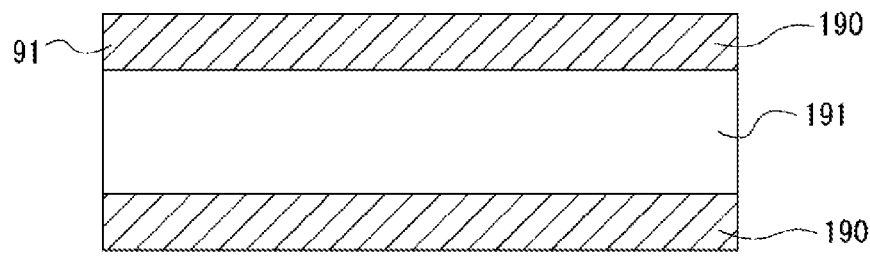

Also, as shown in FIG. 13B, a center of the window 91 may be set as a transmission region 191, and the display region 190 may be set as a peripheral part of the window 91. Alternatively, as shown in FIG. 13C, band-shaped display regions 190 may be formed only at upper and lower parts of the window 91, and a center in the vertical direction may be set as the transmission region 191.

In the structures, the transmission region 191 is a simple glass region, which has the high transmissivity all the time and is not used for display. The transmission region 191 is provided, so that it is possible to obtain a region in which the exterior visibility of the passenger is always completely secured.

<Turn Signal>

Subsequently, the turn signal function is described.

Each window 91 is configured to function as the light output unit for displaying the vehicle exterior image 101, as well. That is, the window 91 may be used as a lamp. An example where the turn signal function is implemented using the window 91 is described.

Figure 14A:
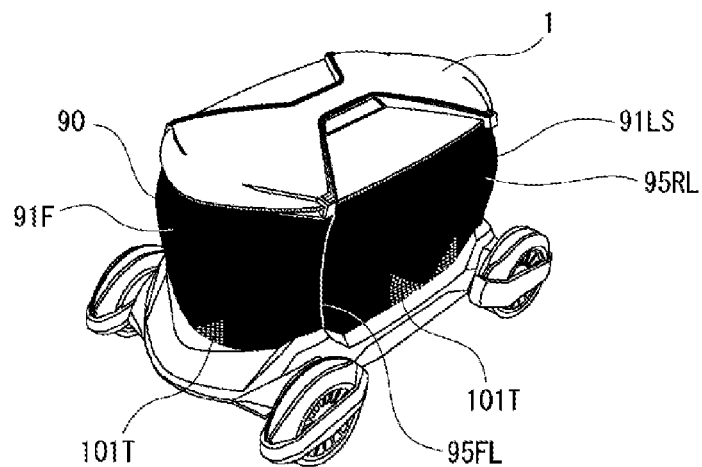
FIGS. 14A, 14B and 14C illustrate a turn signal according to one or more embodiments of the present invention.
Figure 14B:
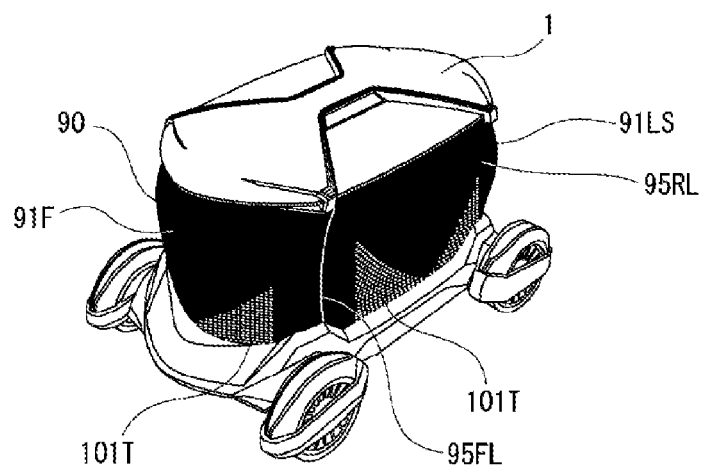
Figure 14C:
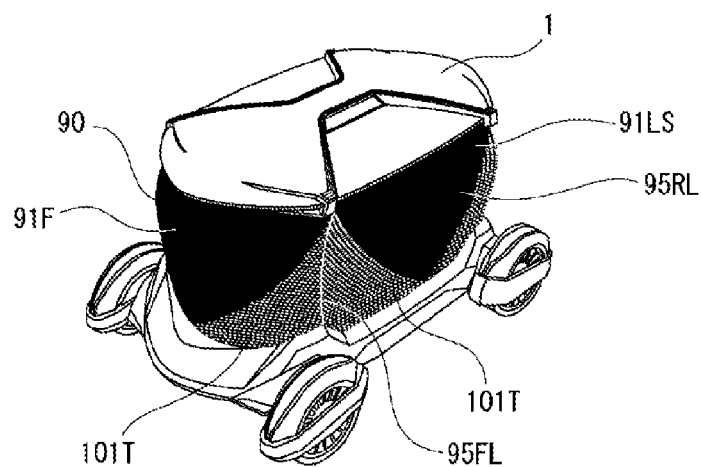

FIG. 14A to 14C depict an example where a turn signal image 101T is displayed as the vehicle exterior image 101 using the image projection by the projectors 8a to 8f.

For example, FIG. 14A to 14C depict a turn signal upon left turn. The display shifts as shown in FIG. 14A→FIG. 14B→FIG. 14C→FIG. 14A . . . , so that a sequential turn signal is expressed. That is, the lights move so that both a light emission position of the front window 91F, which is the light output unit provided at the vehicle body front part, and a light emission position of the light output unit (the front part of the left side window 91LS) provided at the front part of the left-side surface of the vehicle body face toward the left front corner part 95FL of the vehicle 90. Also, the lights move so that both a light emission position of the light output unit (the rear window 91RR) provided at the vehicle body rear part and a light emission position of the light output unit (the rear part of the left side window 91LS) provided at the rear part of the left-side surface of the vehicle body face toward the left rear corner part 95RL of the vehicle 90. For example, a display is made as if waves of the lights advance toward the left front corner part 95FL and the left rear corner part 95RL.

Although not shown, also in the case of a turn signal upon right turn, the lights move so that both a light emission position of the front window 91F, which is the light output unit provided at the vehicle body front part, and a light emission position of the light output unit (the front part of the right side window 91RS) provided at the front part of the right-side surface of the vehicle body face toward the right front corner part 95FR (refer to FIG. 7) of the vehicle 90. Also, the lights move so that both a light emission position of the light output unit (the rear window 91RR) provided at the vehicle body rear part and a light emission position of the light output unit (the rear part of the right side window 91RS) provided at the rear part of the right-side surface of the vehicle body face toward the right rear corner part 95RR of the vehicle 90.

The light emission parts (light output positions) are moved using the large-scale display surface referred to as the window 91, so that it is possible to implement the turn signal of which visibility and impression degree are high.

Particularly, focusing on the corner part 95, in the case of the left turn, the corner parts 95FL, 95RL are visually recognized as if they are blinked, and in the case of the right turn, the corner parts 95FR, 95RR are visually recognized as if they are blinked. The blinking is performed at the vehicle corner parts, so that a person can usually recognize the same as the turn signal.

Also, as the sequential turn, an upper end position of an end of emitted light becomes higher as it comes closer to the corner part 95. Thereby, a warning function as the turn signal is improved.

Figure 15A:
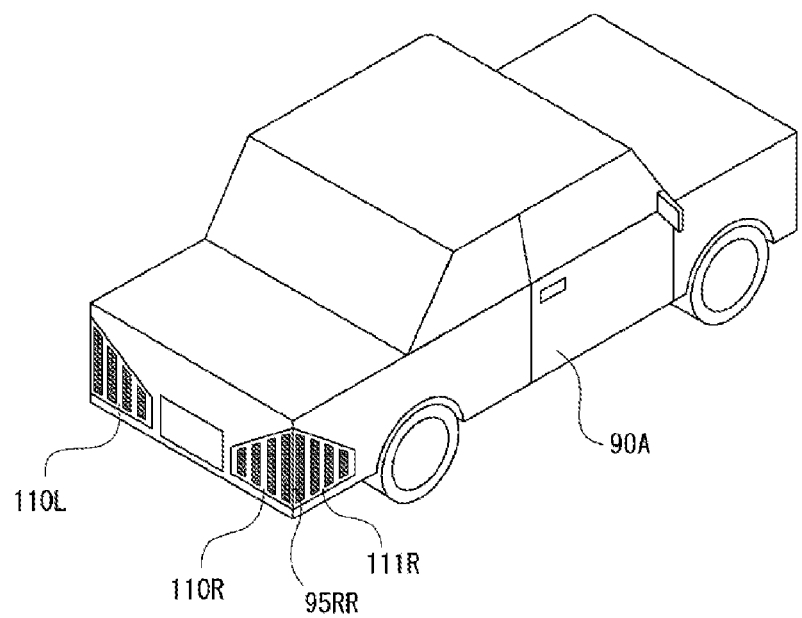
FIGS. 15A, 15B, 15C, 15D and 15E illustrate another turn signal according to one or more embodiments of the present invention.

In the meantime, for example, the turn signal in which the light sequentially moves toward the corner part of the vehicle body can also be implemented in a lamp configuration of a vehicle 90A as shown in FIG. 15A.

The vehicle 90A shown in FIG. 15A has turn lights 110L, 110R at a rear part of the vehicle, and has also a turn light 111R at a rear part of a side surface of the vehicle (the left-side surface is also the same although it is not shown).

Figure 15B:
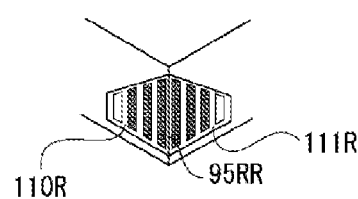
Figure 15C:
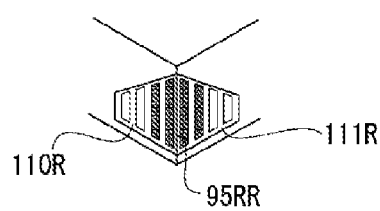
Figure 15D:
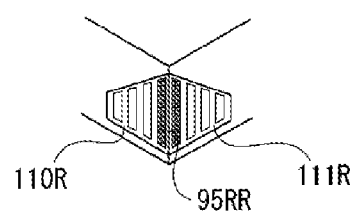
Figure 15E:
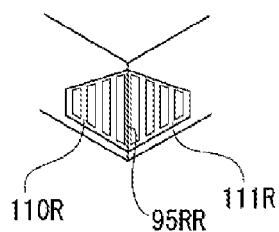

Upon the right turn, the turn lights 110R, 111R perform a sequential lighting as if the lights advance toward the corner part 95RR. For example, the turn lights 110R, 111R have four divided lighting parts, respectively, and are configured so that the lighting is sequentially performed from the lighting part far from the corner part 95RR, as shown in FIG. 15B→FIG. 15C→FIG. 15D→FIG. 15E. By the lighting, it is possible to display the turn signal as if the lights advance toward the corner part 95RR.

Figure 16A:
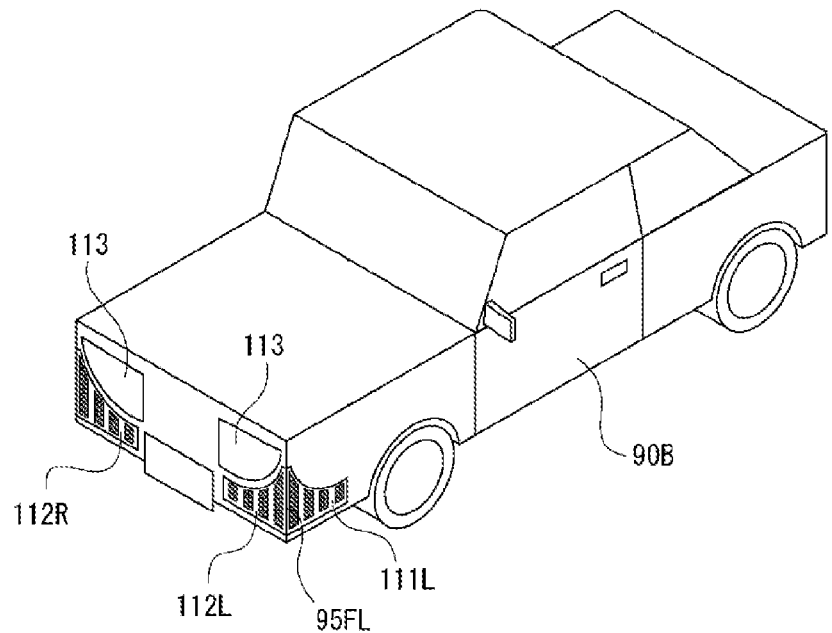
FIGS. 16A, 16B, 16C, 16D and 16E illustrate another turn signal according to one or more embodiments of the present invention.

Also, the similar sequential turn signal can be implemented in a lamp configuration of a vehicle 90B as shown in FIG. 16A.

The vehicle 90B shown in FIG. 16A has turn lights 112L, 112R in the vicinity of a headlight 113 at a front part of the vehicle, and has also a turn light 111L at a front part of a side surface of the vehicle (the right-side surface is also the same although it is not shown).

Figure 16B:
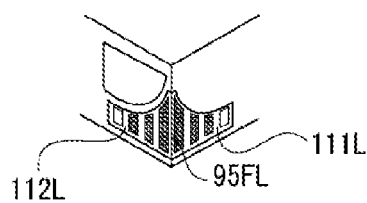
Figure 16C:
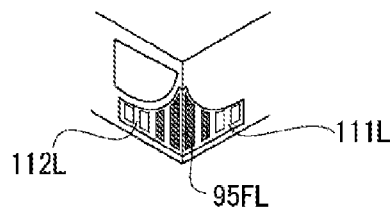
Figure 16D:
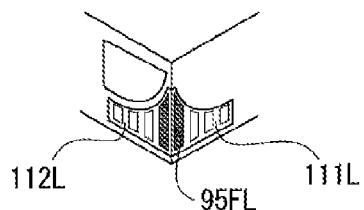
Figure 16E:
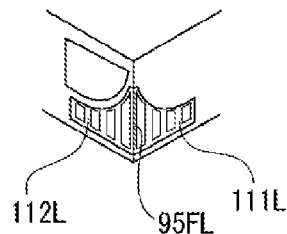

Upon the left turn, the turn lights 112L, 111L perform a sequential lighting as if the lights advance toward the corner part 95FL. For example, the turn lights 112L, 111L have four divided lighting parts, respectively, and are configured so that the lighting is sequentially performed from the lighting part far from the corner part 95FL, as shown in FIG. 16B→FIG. 16C→FIG. 16D→FIG. 16E. By the lighting, it is possible to display the turn signal as if the lights advance toward the corner part 95FL.

In any example of FIGS. 15A to 15E and 16A to 16E, the lamp shape is set so that as the sequential turn, the upper end position of the end of the emitted light becomes higher as it comes closer to the corner part 95. Thereby, the warning function as the turn signal is improved.

A vehicle lamp according to one or more embodiments of the present invention includes a plurality of types of light output units (the headlight unit 3, the rear light unit 4 and the peripheral illumination unit 5) having different illumination functions, a light emission drive unit (the laser light engine 2) configured to cause the plurality of types of light output units to output lights, and a monitoring sensor (the monitoring sensor units 7), and is arranged at an upper part of the vehicle 90.

That is, the vehicle lamp in which the respective units are unitized is configured as the roof module 1, and is arranged at the upper part of the vehicle 90.

By the roof module 1, it is possible to arrange the diverse illumination functions for the vehicle 90.

Also, in this case, the illumination is efficiently performed from the high position of the vehicle 90 by each light output unit, and the periphery monitoring is executed by the monitoring sensor units 7. By the illumination from the high position, it is possible to improve the visibility of the road surface and the like. In particular, the vicinity of the vehicle is illuminated at an angle from the high position by the spot beam output unit 3S or the peripheral illumination unit 5, so that the peripheral brightness is improved. Also, in this state, the peripheral monitoring is executed from the high position, so that it is possible to improve the recognizability of the peripheral person and object. By these configurations, it is possible to contribute to the improvement on the safety upon the vehicle traveling.

Also, the vehicle lamp is configured as the unit serving as the roof module 1 in which the illumination function and the monitoring function are integrated. Therefore, it is possible to simplify the configuration of the vehicle and to efficiently manufacture the vehicle.

In the meantime, as the light emission drive unit (the laser light engine 2), a light source other than the laser light source such as LED may be used, and a plurality of types of other light sources may be used.

Also, in one or more embodiments of the present invention, the plurality of types of light output units (the headlight unit 3, the rear light unit 4 and the peripheral illumination unit 5) is an output unit of the laser light, respectively, and the light emission drive unit (the laser light engine 2) includes the laser light source unit 22 and the drive circuit 23 of the laser light source. The laser light output from the laser light source unit 22 is supplied to each light output unit by the optical fibers 6, which are a light guiding path, and is then output. Like this, the light output units are configured to output the laser light from the common laser light source, so that the laser light source is shared. Thereby, parts for which it is necessary to radiate heat are made as one part, so that it is possible to easily and efficiently make the configuration for heat radiation. That is, according to one or more embodiments of the present invention, a heat radiation structure is concentrated on the arrangement position of the laser light engine 2. Also, even when it is necessary to heat the light source for use in a cold weather region and the like, it is sufficient to heat only one part of the laser light engine 2. Thereby, it is possible to simplify a configuration for heat radiation and heating.

Also, when using the light guiding path such as the optical fibers 6, parts of the optical fibers 6 are exposed to the outside of the vehicle, so that the optical fibers configure a part of an exterior appearance design, like one or more embodiments of the present invention. Thereby, it is possible to improve the design property of the vehicle.

The roof module 1, which is the vehicle lamp of one or more embodiments of the present invention, is formed as the roof unit of the vehicle 90. That is, the vehicle lamp itself is configured as a roof of the vehicle 90. By this structure, it is possible to easily mount the vehicle lamp to the vehicle 90. Also, it is possible to easily replace the vehicle lamp. Also, it is possible to personalize the roof module 1 as the vehicle lamp. For example, a person may customize the vehicle 90 by using the roof module 1.

In the vehicle lamp (the roof module 1) of one or more embodiments of the present invention, the light output unit (for example, the high beam output unit 3H) of far light distribution is provided as one type of the plurality of types of light output units having different illumination functions and the light output unit (for example, the peripheral illumination unit 5) of peripheral light distribution for illuminating the periphery of the vehicle is provided as another type of the plurality of types of light output units having different illumination functions.

Therefore, it is possible to form a vehicle lamp unit for implementing the illumination of far light distribution such as the headlight and the rear light necessary for the vehicle traveling and the peripheral illumination for peripheral illumination and monitoring. For example, it is possible to provide all the illumination functions of the vehicle by the vehicle lamp unit.

Also, the roof module 1 includes the power supply circuit unit 21 configured to generate operating power of each unit and the control unit 20 configured to control the light emitting operation and to control the light emitting operation corresponding to the detection information of the monitoring sensor 7.

That is, the power supply circuit unit and the control unit are also included and unitized. Thereby, it is possible to easily mount the roof module 1 to the vehicle. Also, the control unit 20 is configured to execute the light emission control corresponding to the peripheral situation, so that it is possible to implement the light emitting operation of an aspect corresponding to the situation.

Also, the vehicle lamp of one or more embodiments of the present invention includes the light output units 51 of the peripheral illumination unit 5 capable of expressing a plurality of colors as the illuminating light, and the plurality of the light output units 51 is arranged along the circumferential direction of the vehicle so that the illuminating light from the plurality of the light output units 51 can be irradiated in the entire peripheral direction of the vehicle. Thereby, it is possible to implement a new function of implementing the illumination in the 360° direction of the entire circumference of the vehicle 90. Also, it is possible to increase the recognizability of the exterior environment of the vehicle and to improve the safety.

Also, when the vehicle 90 having the vehicle lamp (the roof module 1) mounted thereto is spread, it is expected that the vehicle itself will be an infrastructure and function as a night illumination in a regional environment where the vehicle 90 is located. That is, all the peripheral illuminations have functions not only as the lamp of the vehicle 90 but also as a lamp in environments.

The roof module 1 as the vehicle lamp of one or more embodiments of the present invention has the monitoring sensor units 7 (the imaging unit) for exterior environment recognition, and the monitoring sensor units 7 are arranged so that the entire peripheral direction of the vehicle 90 can be captured by the monitoring sensor units 7. Also, the roof module includes the analysis unit 24 configured to execute processing of detecting the body to be detected as the object or person around the vehicle from the captured image obtained by the monitoring sensor units 7, and the control unit 20 configured to variably control a color of the illuminating light of the light output unit 51, which is configured to irradiate the illuminating light at least in the direction in which the body to be detected recognized by the analysis unit 24 exists, of the light output units 51 of the peripheral illumination unit 5, in accordance with the main color of the body to be detected That is, the body to be detected as a person or an object is recognized using the captured images of the entire peripheral direction of the vehicle obtained by the monitoring sensor units 7. The illuminating light of a color corresponding to the body to be detected is irradiated to the body to be detected (refer to FIG. 6). Thereby, it is possible to improve the recognition accuracy by the image analysis on a person or an object outside the vehicle. Also, it is possible to highlight a peripheral person or object, thereby improving the visibility of the vehicle passenger on the exterior environments. Therefore, it is possible to highly contribute to the improvement on the safety.

In the meantime, one camera may be mounted as the monitoring sensor unit 7, other than the plurality of cameras. For example, a 360° camera may be arranged on a central upper surface of the roof so as to capture the entire peripheral direction.

Also, when the body to be detected recognized as the exterior environment is located at a near place, a part of the peripheral illumination unit may be turned off or light-shielded. For example, when a person is recognized, the light distribution in the vicinity of a head of the person may be light-shielded or the light output unit 51 performing the illumination in the direction of the recognized person may be turned off so that the glare is not to be irradiated to the peripheral person.

In one or more embodiments of the present invention, the monitoring sensor unit 7 as the imaging unit includes the visible light camera 7a configured to capture the visible light and the far-infrared light camera 7b configured to capture the far-infrared light.

That is, in one imaging unit, a captured image by the visible light camera and a captured image by the far-infrared light camera are obtained as an image in the imaging direction of the one imaging unit, and the body to be detected is detected and recognized using the images. The captured image by the far-infrared light camera is used, so that it is possible to increase the detection accuracy of the peripheral person, animal and the like. For example, it is possible to accurately detect a pedestrian around the vehicle, a child/baby behind the vehicle, and the like, so that it is possible to contribute to improvement on the safety.

In one or more embodiments of the present invention, the plurality of light output units 51 of the peripheral illumination unit 5 is aligned in line on the entire circumference surface of the roof part of the vehicle, and the vertical light emission direction of the light output unit 51 is below the horizontal direction of the roof part (refer to FIGS. 4A and 4B).

The peripheral illumination unit is provided to the roof part, so that it is possible to improve the visibility of the peripheral illumination from persons around the vehicle 90 at a relatively high position.

Thereby, it is possible to improve the peripheral person's recognition about the illumination of the peripheral illumination unit and to easily transfer the illumination notification. The peripheral illumination unit is arranged at the upper part, which is advantageous to draw the road surface by the peripheral illuminating light.

Also, the light distribution is made to be below the horizontal direction of the roof part, so that it is possible to prevent the glare from being irradiated to a peripheral person or a far person.

In the meantime, the peripheral illumination unit 5 may be provided in the vicinity of the bottom part of the vehicle body 90. That is, the present invention is not limited to the configuration where the peripheral illumination unit is provided to the roof module 1.

Also, the light output unit 51 has the output units (5R, 5G, 5B) of the respective laser lights of red light, green light and blue light. The light output units configured to output the R (red) laser light, G (green) laser light and B (blue) laser light are aligned, so that it is possible to perform illumination, exterior notification and the like by the diverse color expressions.

Also, in one or more embodiments of the present invention, the vehicle body 90 having the roof module 1 includes the light output units provided on the side surfaces of the vehicle body 90. The light output units are the windows 91RS, 91LS, the turn light 111L shown in FIG. 16A to 16E, and the like. The light output unit is configured to perform the turn signal light emission (sequential light emission) in which the end of the emitted light gradually moves toward the front part of the vehicle body.

Thereby, it is possible to implement, as the turn signal of the vehicle 90, the highly recognizable light output from the peripheral person, particularly, from the side of the vehicle.

Also, in the examples of FIGS. 14A to 14C and 16A to 16E, the light output unit is configured to perform the light emission in such a way that the upper end of the emitted light becomes higher toward the front side of the vehicle body. Like this, upon the sequential light emission, the upper end of the light emission region becomes gradually higher, so that it is possible to further improve the recognizability of the turn signal.

Also, in one or more embodiments of the present invention, the light output units configured to perform light output separately from each other for each of the left front, left rear, right front and right rear corner parts 95 of the vehicle body at least at both side positions of the corner part 95 are provided. The light output units are the windows 91 (91F, 91RS, 91LS, 91RR), the turn lights 111R, 111L of FIGS. 15A to 15E and 16A to 16E, and the like.

Also, as the right turn signal, the light is output to each of the right front and right rear corner parts 95FR, 95RR from the light output units of both sides of each corner part.

The light output units of both sides are the front window 91F and the right side window 91RS with respect to the corner part 95FR, for example. Alternatively, the light output units are the turn light 112R shown in FIG. 16A to 16E and the turn light (not shown) formed at the right side in the same manner as the turn light 111L.

The light output units of both sides with respect to the corner part 95RR are the rear window 91RR and the right side window 91RS. Alternatively, the light output units are the turn lights 110R, 111R shown in FIG. 15A to 15E.

Also, as the left turn signal, the light is output to each of the left front and left rear corner parts 95FL, 95RL from the light output units of both sides of each corner part.

The light output units of both sides are the front window 91F and the left side window 91LS with respect to the corner part 95FL, for example. Alternatively, the light output units are the turn light 112L, 111L shown in FIG. 16A to 16E.

The light output units of both sides with respect to the corner part 95RL are the rear window 91RR and the left side window 91LS. Alternatively, the light output units are the turn light 110L shown in FIG. 15A to 15E and the turn light (not shown) formed at the left side in the same manner as the turn light 111R.

In this way, the light output units are formed at both side positions of each corner part, as seen from each corner part 95 of the vehicle body. As the right turn signal, the light output is performed at least at the right side of the vehicle body front part, at the front and rear parts of the right-side surface of the vehicle body, and at the right side of the vehicle body rear part. As the left turn signal, the light output is performed at least at the left side of the vehicle body front part, at the front and rear parts of the left-side surface, and at the left side of the vehicle body rear part.

Therefore, it is possible to implement, as the turn signal of the vehicle, the highly recognizable light output from the peripheral persons.

Also, in the case of the right turn signal, the light output operation is performed so that both the light emission position of the light output unit provided at the vehicle body front part and the light emission position of the light output unit provided at the front part of the right-side surface of the vehicle body face toward the right front corner part 95FR of the vehicle and both the light emission position of the light output unit provided at the vehicle body rear part and the light emission position of the light output unit provided at the rear part of the right-side surface of the vehicle body face toward the right rear corner part 95RR of the vehicle.

In the case of the left turn signal, the light output operation is performed so that both the light emission position of the light output unit provided at the vehicle body front part and the light emission position of the light output unit provided at the front part of the left-side surface of the vehicle body face toward the left front corner part 95FL of the vehicle and both the light emission position of the light output unit provided at the vehicle body rear part and the light emission position of the light output unit provided at the rear part of the left-side surface of the vehicle body face toward the left rear corner part 95RL of the vehicle (refer to FIGS. 14A to 14C, 15A to 15E and 16A to 16E).

That is, in the case of the right turn, the display is performed as if the lights (light output positions) advance from both sides toward the front and rear corner parts (95FR, 95RR) of the right side of the vehicle body, and in the case of the left turn, the sequential turn signal display is performed as if the lights (light output positions) advance from both sides toward the front and rear corner parts (95FL, 95RL) of the left side of the vehicle body. Thereby, it is possible to perform the notifications of the right and left turns having the high visibility.

Also, in one or more embodiments of the present invention, the front window 91F, the right side window 91RS, the left side window 91LS and the rear window 91RR of the vehicle are respectively configured as the light output units, and the windows 91 of the vehicle are used as the large-scale light output units to perform the turn signal light emission.

The window 91 of the vehicle 90 having a large area is used as the light output unit, so that it is possible to implement the turn signal of which impression degree is high and the visibility is favorable.

In particular, as the vehicle exterior image 101, the display of the turn signal image 101T is also performed (refer to FIG. 14A to 14C). The turn signal image 101T, which indicates the turn direction as any one of the right and left corner parts becomes noticeable by the window display, is displayed, so that it is possible to generate the turn signal light having higher impression degree and visibility, as diverse images or dynamic images.

Also, focusing on the corner part 95, the turn signal display shown in FIG. 14A to 14C is a display operation of blinking the corner part 95. That is, the turn direction is indicated by any one blinking of the left and right corner parts, so that it is possible to increase the recognizability as the turn signal.

Also, the image projection unit 8 arranged at the vehicle 90 is configured to project the turn signal light to each window 91, thereby outputting the turn signal light from each window 91 as the light output unit.

By the configuration where the image projection unit 8 projects an image on the window to generate the turn signal, it is possible to improve the degree of freedom of generating the turn signal light having high impression degree and visibility, as diverse images or dynamic images.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1 . . . roof module, 2 . . . laser light engine, 3 . . . headlight unit, 4 . . . rear light unit, 5 . . . peripheral illumination unit, 6 . . . optical fiber, 7 . . . monitoring sensor unit, 8 . . . image projection unit, 20 . . . control unit, 21 . . . power supply circuit unit, 22 . . . laser light source unit, 23 . . . drive circuit, 24 . . . analysis unit, 51 . . . light output unit 91 . . . window, 91F . . . front window, 91RS . . . right side window, 91LS . . . left side window, 91RR . . . rear window

The invention claimed is:

1. A vehicle lamp comprising:
a roof unit arranged at a roof part of a vehicle; and
a controller configured to control a light emitting operation corresponding to detection information of a monitoring sensor,
wherein the roof unit comprises:
a plurality of types of light output units having different illumination functions,
a light emission drive unit configured to cause the plurality of types of light output units to output lights, and
the monitoring sensor,
wherein a far light distribution light output unit is provided as one type of the plurality of types of light output units having different illumination functions, and a peripheral light distribution light output unit for illuminating a periphery of the vehicle is provided as another type of the plurality of types of light output units having different illumination functions,
wherein the monitoring sensor comprises one or more imaging units for exterior environment recognition,
wherein the peripheral light distribution light output unit comprises a plurality of light output units capable of expressing a plurality of colors as illuminating light,
wherein the one or more imaging units are arranged to capture an entire peripheral direction of the vehicle, and
wherein the plurality of light output units and the one or more imaging units are arranged at the roof part of the vehicle, along a circumferential direction of the vehicle to illuminate the illuminating light in an entire peripheral direction of the vehicle.

2. The vehicle lamp according to claim 1,
wherein each of the plurality of types of light output units outputs laser light,
wherein the light emission drive unit comprises a laser light source and a drive circuit of the laser light source, and
wherein a laser light output from the laser light source is supplied to each light output unit by a light guiding path and is then output.

3. The vehicle lamp according to claim 1, further comprising:
a power supply circuit configured to generate operating power of each unit.

4. The vehicle lamp according to claim 1,
wherein the plurality of light output units of the peripheral light distribution light output unit is aligned in line on an entire circumference surface of the roof part of the vehicle, and
wherein a vertical light emission direction of the light output units is below a horizontal direction of the roof part.

5. The vehicle lamp according to claim 1, wherein the light output units comprise laser light output units that emit red light, green light and blue light, respectively.

6. The vehicle lamp according to claim 1, further comprising:
a light output unit provided on a side surface of a vehicle body of the vehicle,
wherein the light output unit is configured to display an image on the side surface of the vehicle body, and
wherein an end of emitted light of the image moves toward a front part of the vehicle body.

7. The vehicle lamp according to claim 6, wherein the light output unit is configured to perform light emission such that an upper end of the emitted light of the image becomes higher toward the front part of the vehicle body.

8. The vehicle lamp according to claim 6, wherein the light output unit is configured to perform turn signal light emission.

* * * * *